United States Patent
Nakakura

(10) Patent No.: US 6,191,832 B1
(45) Date of Patent: Feb. 20, 2001

(54) ACTIVE MATRIX DISPLAY DEVICE AND METHODS FOR CORRECTING DEFECT THEREOF

(75) Inventor: Yukihiko Nakakura, Tsu (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 08/896,424

(22) Filed: Jul. 18, 1997

(30) Foreign Application Priority Data

Jul. 19, 1996 (JP) .................................................. 8-191130

(51) Int. Cl.[7] .......................... G02F 1/136; G02F 1/1333; G02F 1/1343
(52) U.S. Cl. .................................. 349/54; 349/55; 349/52
(58) Field of Search ................................ 349/192, 44, 54, 349/55

(56) References Cited

U.S. PATENT DOCUMENTS

| | | | |
|---|---|---|---|
| 4,688,896 | 8/1987 | Castleberry | 350/333 |
| 4,938,567 * | 7/1990 | Chartier | 350/333 |
| 5,006,106 | 4/1991 | Sakamoto et al. | 359/59 |
| 5,303,074 * | 4/1994 | Salisbury | 349/55 |
| 5,343,216 * | 8/1994 | Katayama et al. | 349/54 |
| 5,585,951 | 12/1996 | Noda et al. | 349/42 |
| 5,641,974 | 6/1997 | den Boer et al. | 349/138 |
| 5,734,450 * | 3/1998 | Irie et al. | 349/192 |
| 5,825,438 * | 10/1998 | Song et al. | 349/54 |
| 5,995,178 * | 11/1999 | Fujikawa et al. | 349/55 |

FOREIGN PATENT DOCUMENTS

| | | |
|---|---|---|
| 61-156025 | 7/1986 | (JP) . |
| 9-90318 | 4/1997 | (JP) . |

OTHER PUBLICATIONS

Kim et al, SID 95 Digest, pp. 15–18, 1995.

* cited by examiner

Primary Examiner—James A. Dudek
Assistant Examiner—Dung Nguyen
(74) Attorney, Agent, or Firm—Nixon & Vanderhye P.C.

(57) ABSTRACT

An active matrix display device of the present invention includes: a plurality of pixel electrodes arranged in a matrix; a plurality of switching elements connected to the respective pixel electrodes; a plurality of scanning lines for supplying a scan voltage to the switching elements; a plurality of signal lines for supplying a signal voltage to the switching elements, provided so as to cross the scanning lines; and a bypass spare line for avoiding at least one of a disconnected portion and a leak portion, formed so as to overlap at least one of the scanning line and the signal line with an insulating film interposed therebetween, wherein the bypass spare line and at least one of the scanning line and the signal line are electrically connected to each other.

33 Claims, 19 Drawing Sheets

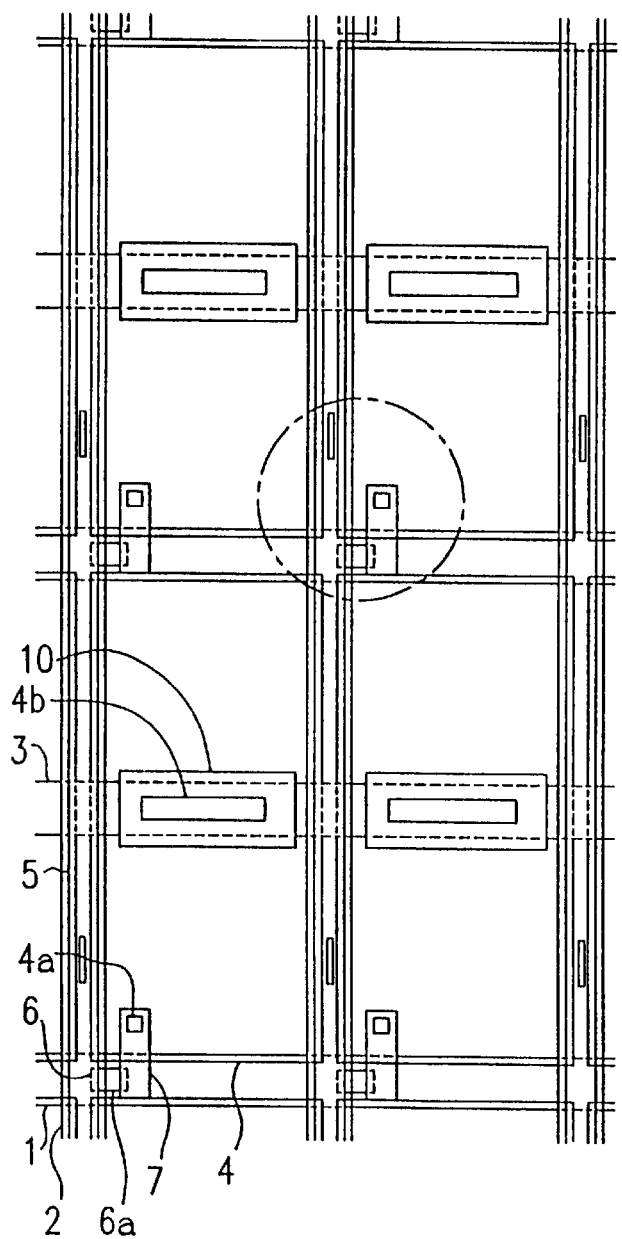
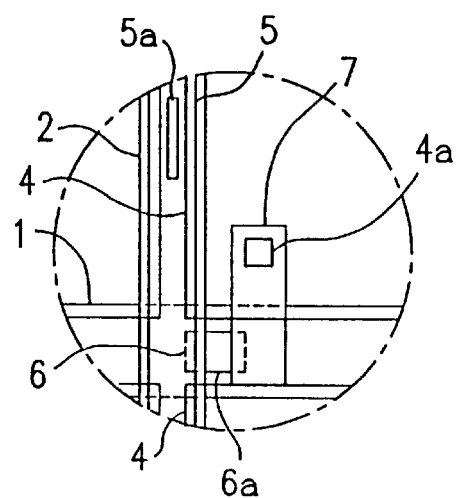
FIG. 1A
FIG. 1B

ACTIVE MATRIX DISPLAY DEVICE AND METHODS FOR CORRECTING DEFECT THEREOF

BACKGROUND OF THE INVENTION

1. Field of the Invention

The present invention relates to an active matrix display device used as a display device for a computer display screen, a television, a light bulb of a projector or the like, and a method for correcting a defect thereof.

2. Description of the Related Art

A display device such as a liquid crystal display device or a plasma display device includes a plurality of pixel electrodes arranged in a matrix, and a plurality of counter electrodes disposed so as to oppose the respective pixel electrodes. A display medium such as liquid crystal or plasma is interposed between the pixel electrodes and the counter electrodes. In such a display device, when a driving signal is applied to the pixel electrodes, the display medium is optically modulated due to a voltage generated between the pixel electrodes and the counter electrodes. By selectively applying a driving signal to the pixel electrode taking advantage of the modulation principle, a display pattern is displayed on a screen.

One known method for driving such a display device is an active matrix driving method. An active matrix display device includes an active matrix substrate, a counter substrate disposed so as to oppose the active matrix substrate, and a display medium interposed therebetween. In the active matrix substrate, a plurality of pixel electrodes disposed in a matrix are respectively connected to switching elements so that an electric potential is selectively applied to the respective pixel electrodes via these switching elements. In general, a thin film transistor (TFT), a metal-insulator-metal (MIM) element or the like is used as the switching element.

In the conventional active matrix substrate described above, one of the bus lines, that is, a signal line, a scanning line or the like, is generally formed in the same layer as that of the pixel electrodes so as not to be in contact therewith. In recent years, an active matrix substrate having another configuration has been described (Japanese Laid-Open Patent Publication No. 61-156025). In such an active matrix substrate, an insulating film is provided so as to cover the signal lines or the scanning lines. A plurality of pixel electrodes are formed on the insulating film, and the pixel electrodes are connected to their respective switching elements. Since the pixel electrodes and the bus lines are separately formed in different layers in this configuration, it is possible to prevent an aperture ratio from being lowered by increasing the area of the pixel electrodes.

FIG. 15 is a plan view showing one pixel of the active matrix substrate having the configuration described in the above Patent Publication. In this active matrix substrate, scanning lines 52 and signal lines 53 are provided so as to cross each other. An insulating film (not shown) is formed so as to cover the scanning lines 52 and the signal lines 53. A pixel electrode 51 is formed on the insulating film. The pixel electrode 51 is connected to a drain electrode 52 of a thin film transistor (TFT) 55 via a contact hole 51b formed through the insulating film. By forming the pixel electrode 51 on the insulating film covering the scanning lines 52 and the signal lines 53 (the bus lines), the pixel electrode 51 and the bus lines 52 and 53 are separately formed in different layers.

The active matrix substrate shown in FIG. 15 has a Cs (storage capacity) on Common configuration. Specifically, a Cs line 59 common to the pixels is provided so as to be parallel to the scanning line 52. On the Cs line 59, a Cs electrode 56 is formed via a gate insulating film (not shown). The Cs electrode 56 is connected to the pixel electrode 51 via the contact hole 51a formed through the insulating film. A storage capacitor is constituted by the overlapping portion of the Cs line 59, the gate insulating film, and the Cs electrode 56.

In the active matrix display device using such an active matrix substrate, the disconnection of a bus line disadvantageously becomes a problem due to a defect occurring upon fabrication. In recent years, the width of the bus line has been minimized so as to prevent the aperture ratio from being lowered and thereby improving the accuracy of the display device. On the other hand, since the number of bus line intersections increases, a disconnection of a bus line and a leak at the intersection of the bus lines is more likely to occur as compared with a conventional active matrix display device. When a defect such as a disconnection of bus lines or a leak occurs, such a defect appears as a line defect on the display because a normal voltage is not applied from the bus line to the pixel electrode. The line defect is fatal for the display device; the display device which turns out to have a line defect is discarded as a defective product. As a result, the ratio of acceptable display device products is lowered thereby increasing the fabrication cost thereof.

In order to eliminate the above-mentioned problems resulting from the defects, i.e., the disconnection of the bus lines, an active matrix liquid crystal display device, in which two bus lines are provided for one pixel electrode, has been described (SID' 95 DIGEST of TECHNICAL PAPERS 4: AMLCDs 4.3; "High-Aperture and Fault-Tolerant Pixel Structures for TFT-LCDs"). FIG. 16 is a plan view showing an active matrix substrate of the liquid crystal display device.

In the active matrix substrate shown in FIG. 16, two scanning lines 52 and 52' are provided for each pixel electrode 51. Each of the scanning lines 52 and 52' is short-circuited by short-circuit lines 54 and 54' which are respectively provided along signal lines 53 and 53'. Each of the short-circuit lines 54 and 54' overlaps the pixel electrode 51 via an insulating film (not shown). The overlapping portion of the short-circuit lines 54 and 54' and the pixel electrode 51 serves as a storage capacitor.

A TFT 55 is driven by the two scanning lines 52 and 52' in the liquid crystal display device using such an active matrix substrate. Thus, even if a disconnection occurs in one of the two scanning lines 52 and 52', it is possible to apply a scan voltage to the TFT 55 via the short-circuit lines 54 and 54'. Moreover, since the short-circuit lines 54 and 54' are provided so as to partially overlap the pixel electrode 51 on the active matrix substrate side, part of a light-shielding pattern formed on the counter substrate so as to prevent light from leaking from a region between the adjacent pixel electrodes 51 can be omitted.

In order to reduce the above-mentioned problems resulting from the disconnection of bus lines, the Applicant of the present invention has described an active matrix substrate as shown in FIGS. 17 and 18 in Japanese Patent Application No. 7-251339, "Active matrix liquid crystal display device and Method for correcting pixel defect". FIG. 17 is a plan view showing the structure of an active matrix substrate, and FIG. 18 is a plan view specifically showing one pixel of the active matrix substrate shown in FIG. 17. In the illustrated active matrix substrate, a signal line 2 and a spare line 105 are alternately provided at predetermined intervals in the same layer so as to parallel to each other. The signal line 2 and the spare line 105 are connected to each other by a short-circuit line provided in the same layer. With this configuration, even if the disconnection of the signal line 2 occurs, the defective portion of the signal line 2 where the disconnection occurs is avoided through the spare line 105. Therefore, a signal voltage can be applied to part of the signal line 2 which is positioned ahead of the disconnected portion.

This Japanese Patent Application No. 7-251339 also proposes an active matrix substrate as shown in FIG. 19. In this active matrix substrate, a scanning line 1 and a spare line 122 are alternately provided at predetermined intervals in the same layer so as to parallel to each other. Then, the scanning line 1 and the spare line 122 are connected to each other by a short-circuit line formed in the same layer. With this configuration, even if a disconnection of the scanning line 1 occurs, the disconnected portion of the scanning line 1 is avoided through the spare line 122. Therefore, a signal voltage can be applied to the part of the signal lines 1 which is positioned ahead of the disconnected portion.

As described above, various configurations have been described so as to eliminate the problems generated by the disconnection of bus lines. However, the above configurations have the following problems.

For example, in the case where two scanning lines (or signal lines) are provided for one pixel electrode in the same layer in the active matrix substrate having a general configuration as shown in FIG. 16, it is necessary to place the signal lines (or scanning lines) so as not to be in contact with the pixel electrodes. Therefore, since the size of the pixel electrode cannot be increased, the aperture ratio of the display device cannot be maintained. Since it is necessary to reduce the distance between the scanning lines (or the signal lines) so as to maximize the aperture ratio under such a restriction, a leak is likely to occur between the two scanning lines (or signal lines).

Since the signal line and the spare line are formed in the same layer on the active matrix substrate shown in FIGS. 17 and 18, there is a possibility that a leak may occur not only at the intersection of the signal line and the scanning line but also at the intersection of the spare line and the scanning line. Accordingly, in the case where a leak between the signal line and the scanning line is detected while measuring the resistance between terminals of the respective lines, it is extremely difficult to specify the portion where the defect occurs: that is, it cannot be clearly distinguished whether the defect occurs at the intersection of the signal line and the scanning line or at the intersection of the spare line and the scanning line. Therefore, a special method is needed for determining the leak region to be corrected. Moreover, since the spare line traverses the pixel electrode with the insulating film interposed therebetween, an electric capacitor is generated between the pixel electrode and the spare line. In order to reduce this capacitance effect, it is necessary to use a material having a low dielectric as the insulating film material or to apply a special driving signal. Moreover, in order to prevent the aperture ratio of the display device from being lowered, it is necessary to reduce the line width of the spare line or to form the spare line using a transparent conductive film such as Indium Tin Oxide (ITO). Since the signal line and the spare line are formed in the same layer, the signal line and the spare line should be formed using the same material. However, in the case of a large display device, the length of the bus line is correspondingly increased. Thus, it is difficult to form the signal lines by using a material having a high specific resistivity such as ITO. Accordingly, a metal material having a low specific resistivity such as aluminum is used as the material of the spare line. Since the metal materials are opaque, the width of the spare line should be reduced so as not to reduce the aperture ratio. Thus, there is the possibility that disconnection of the spare line occurs.

Furthermore, since the scanning line and the spare line are formed in the same layer in the active matrix substrate shown in FIG. 19, the same problems are those of the active matrix substrate shown in FIGS. 17 and 18 described above also arise.

SUMMARY OF THE INVENTION

An active matrix display device of the present invention includes: a plurality of pixel electrodes arranged in a matrix; a plurality of switching elements connected to the respective pixel electrodes; a plurality of scanning lines for supplying a scan voltage to the switching elements; a plurality of signal lines for supplying a signal voltage to the switching elements, provided so as to cross the scanning lines; and a bypass spare line for avoiding at least one of a disconnected portion and a leak portion, formed so as to overlap at least one of the scanning line and the signal line with an insulating film interposed therebetween, wherein the bypass spare line and at least one of the scanning line and the signal line are electrically connected to each other.

According to another aspect of the invention, a method for correcting a defect of the active matrix display device described above, the method includes the steps of: determining the presence of a leak at the intersection of the scanning line and the signal line; and cutting one of the scanning line and the signal line with which the bypass spare line overlaps.

According to still another aspect of the invention, a method for correcting a defect of an active matrix display device including: a plurality of pixel electrodes arranged in a matrix; a plurality of switching elements connected to the respective pixel electrodes; a plurality of scanning lines for supplying a scan voltage to the switching elements; and a plurality of signal lines for supplying a signal voltage to the switching elements, provided so as to cross the scanning lines, the method includes the steps of: determining the presence of a disconnection in the scanning lines and the signal lines; and forming a bypass spare line on the line including the disconnection in an overlapped manner with an insulating film interposed therebetween, and electrically connecting the bypass spare line and at least one of the scanning line and the signal line to each other.

According to yet another aspect of the invention, a method for correcting a leak of an active matrix display device including: a plurality of pixel electrodes arranged in a matrix; a plurality of switching elements connected to the respective pixel electrodes; a plurality of scanning lines for supplying a scan voltage to the switching elements; and a plurality of signal lines for supplying a signal voltage to the switching elements, provided so as to cross the scanning lines, the method includes the steps of: determining the presence of a leak in the scanning lines and the signal lines; and cutting at least one of the scanning line and the signal line including an intersection where the leak occurs, at two points with the intersection positioned therebetween; forming a bypass spare line on the line including the intersection where the leak occurs in an overlapped manner with an insulating film interposed therebetween, and electrically connecting the bypass spare line and at least one of the scanning line and the signal line to each other.

According to yet another aspect of the invention, an active matrix display device includes: a plurality of pixel electrodes arranged in a matrix; a plurality of switching elements connected to the respective pixel electrodes; a plurality of scanning lines for supplying a scan voltage to the switching elements; and a plurality of signal lines for supplying a signal voltage to the switching elements, provided so as to cross the scanning lines, wherein a bypass spare line is formed so as to overlap at least one of the scanning line and the signal line where a disconnection occurs with an insulating film interposed therebetween, and the bypass spare line and at least one of the scanning line and the signal line are electrically connected to each other.

According to yet another aspect of the invention, an active matrix display device includes: a plurality of pixel electrodes arranged in a matrix; a plurality of switching elements connected to the respective pixel electrodes; a plurality of scanning lines for supplying a scan voltage to the switching elements; and a plurality of signal lines for supplying a signal voltage to the switching elements, provided so as to cross the scanning lines, wherein at least one of the scanning line and the signal line including an intersection where a leak occurs is cut at two points with the intersection positioned therebetween, a bypass spare line overlaps the cut line with an insulating film interposed therebetween, and the bypass spare line and at least one of the scanning line and the signal line are electrically connected to each other.

According to the present invention, one or both a scanning line and a signal line is electrically connected to a bypass spare line. A scan voltage or a signal voltage is transmitted through the bypass spare line so as to avoid the portion where a disconnection or a leak defect occurs. Therefore, the scan voltage or the signal voltage is applied to the portion of the line ahead of the defective portion. As a result, a line defect is prevented from occurring. Since the bypass spare line is formed so as to overlap the scanning line or the signal line with an insulating film interposed therebetween, the bypass spare line does not prevent light from transmitting through pixels. Thus, the aperture ratio of the display device is not lowered.

According to the present invention, the display is inspected for the presence of disconnections at the scanning line and the signal line intersections. If a disconnection is detected, the bypass spare line is formed on the defective line in an overlapped manner, interposing the insulating film therebetween. The defective line and the bypass spare line are electrically connected to each other. Since a scan voltage or a signal voltage is transmitted through the bypass spare line so as to be applied to the line ahead of the portion where the disconnection occurs, a line defect does not occur on the display. In the case where a disconnection occurs, the insulating film and the bypass spare line need only be formed in the region where the disconnection occurs. Thus, fabrication costs can be lowered.

Moreover, according to the present invention, the presence of a leak at the intersection between the scanning line and the signal line is detected. Either the scanning line or the signal line affected by the leak is cut at two points with the intersection where the leak occurs positioned therebetween. The bypass spare line is formed on the cut line in an overlapped manner, with an insulating film interposed therebetween, so as to connect the cut line and the bypass spare line to each other. If the signal line is cut at two points with the intersection where a leak occurs therebetween, a signal voltage is not applied to the signal line. As a result, a leak of the scanning line and the signal line does not occur. Moreover, even if the signal line is cut in such a manner, a line defect does not occur because a signal voltage is transmitted through the bypass spare line and applied to the signal line ahead of the cut portion of the signal line. In this case, there is no difficulty in specifying whether a leak occurs at the intersection of the scanning line and the signal line or at the intersection of the scanning line and the bypass spare line. On the other hand, if the scanning line is cut at two points with the intersection where a leak occurs positioned therebetween, a scan voltage is prevented from being applied to the scanning line. As a result, a leak between the scanning line and the signal line does not occur. Moreover, even if the scanning line is cut in such a manner, a scan voltage is transmitted through the bypass spare line and applied to the scanning line ahead of the cut portion. Therefore, a line defect does not occur. Furthermore, in the case where a leak occurs, the insulating film and the bypass spare line need only be formed on the defective portion. Thus, fabrication costs can be reduced.

The bypass spare line may be formed so as to avoid the intersection of the scanning line and the signal line. Such a configuration is advantageous in that a leak at the intersection can be corrected by laser radiation or the like even after the display device is completed by attaching the active matrix substrate and the counter substrate to each other and subsequently injecting a display medium such as a liquid crystal into a gap therebetween. The bypass spare line overlaps the scanning line or the signal line interposing the insulating film therebetween, and bypasses the intersection. Therefore, the bypass spare line does not prevent light from transmitting through the pixel. Even if so, an area where light is shielded by the bypass spare line is extremely small. Thus, the bypass spare line does not affect the display quality.

The bypass spare line may be electrically connected to the scanning line or the signal line via the contact hole formed through the insulating film. In this case, it is preferred that the contact hole is located at a predetermined position apart from each of the intersections of the line overlapping the bypass spare line and the crossing line. In the case where two or more contact holes are formed apart from each of the intersections, a portion of the scanning line present between the contact holes is not connected to a portion of the scanning line corresponding to the adjacent pixel electrode, or a portion of the signal line present between the contact holes is not connected to a portion of the signal line corresponding to the adjacent pixel electrode. On the other hand, in the case where one contact hole is formed at a predetermined position apart from each of the intersections, a portion of the scanning line corresponding to the pixel electrode and a portion of the scanning line corresponding to the adjacent pixel electrode can be connected by the bypass spare line, or a portion of the signal line corresponding to the pixel electrode and a portion of the signal line corresponding to the adjacent pixel electrode can be connected by the bypass spare line. Alternatively, the contact hole may be formed through the insulating film on each of the ends of the scanning line or the signal line. In this case, it is possible to place a connecting section between the scanning line and the bypass spare line or a connecting section between the signal line and the bypass spare line in the region other than the display region, where the pixel electrodes are not formed. Accordingly, the area of the connecting section between the scanning line and the bypass spare line and the area of the connecting section between the signal line and the bypass spare line can be increased. Therefore, a connection resistivity of the connection sections is lowered to improve a reliability of the connection.

It is preferred that the bypass spare line is made of a transparent conductor. For example, if a transparent conductor such as indium tin oxide (ITO) is used, light transmitting through the pixel is not blocked even if the bypass spare line is formed so as to protrude from the scanning line or the signal line in the width direction. Therefore, it is possible to form the bypass spare line so as to have a width sufficiently larger than that of the scanning line or the signal line. As a result, the occurrence of a disconnection of the bypass spare line is reduced.

The bypass spare line may be formed of an opaque conductor. For example, if an aluminum film is used as an opaque conductor for the bypass line, the resistivity of the bypass spare line can be reduced. In such a case, it is sufficient to set the width of the bypass spare line to be equal to or smaller than that of a light-shielding pattern such as a black matrix (BM), that is, it is not necessary to particularly reduce the width of the bypass spare line.

It is preferred that the pixel electrode is formed on an organic insulating film covering the signal lines. In general, since the organic insulating film has a low dielectricity, the capacitance between the pixel electrode and the signal line can be reduced. In this case, it is also possible to reduce the capacitance between the scanning line formed below the signal line and the pixel electrode.

The bypass spare line may be formed on the organic insulating film covering the signal lines. Since the signal lines are formed on the insulating film covering the scanning lines, the signal lines may be disconnected due to steep unevenness generated by a poorly formed insulating film, peal-off of the insulating film or the like. If the bypass spare line is formed on the organic insulating film covering the signal lines, a disconnection of the bypass spare line rarely occurs because the organic insulating film may be flattened. If the pixel electrodes and the bypass spare lines are formed in the same layer, the fabrication cost can be reduced.

The pixel electrode may be formed on the second insulating film covering the bypass spare line. In such a case, a leak between the pixel electrode and the bypass spare line rarely occurs because the pixel electrodes and the bypass spare lines are formed in different layers.

If at least one of the insulating films covering the signal lines and a second insulating film is formed of an organic insulating film, the occurrence of disconnection of the bypass spare line can be reduced.

Thus, the invention described herein makes possible the advantages of: (1) providing an active matrix display device capable of preventing the occurrence of a line defect, correcting such a defect, and preventing an aperture ratio from being lowered; and (2) providing a method for correcting such a defect.

These and other advantages of the present invention will become apparent to those skilled in the art upon reading and understanding the following detailed description with reference to the accompanying figures.

BRIEF DESCRIPTION OF THE DRAWINGS

FIG. 1A is a plan view showing the configuration of an active matrix substrate in an active matrix display device of Example 1, and FIG. 1B is an enlarged plan view showing a TFT portion of the active matrix substrate shown in FIG. 1A.

DESCRIPTION OF THE PREFERRED EMBODIMENTS

Hereinafter, the present invention will be described by way of illustrative examples with reference to the drawings.

Example 1

Figure 2:
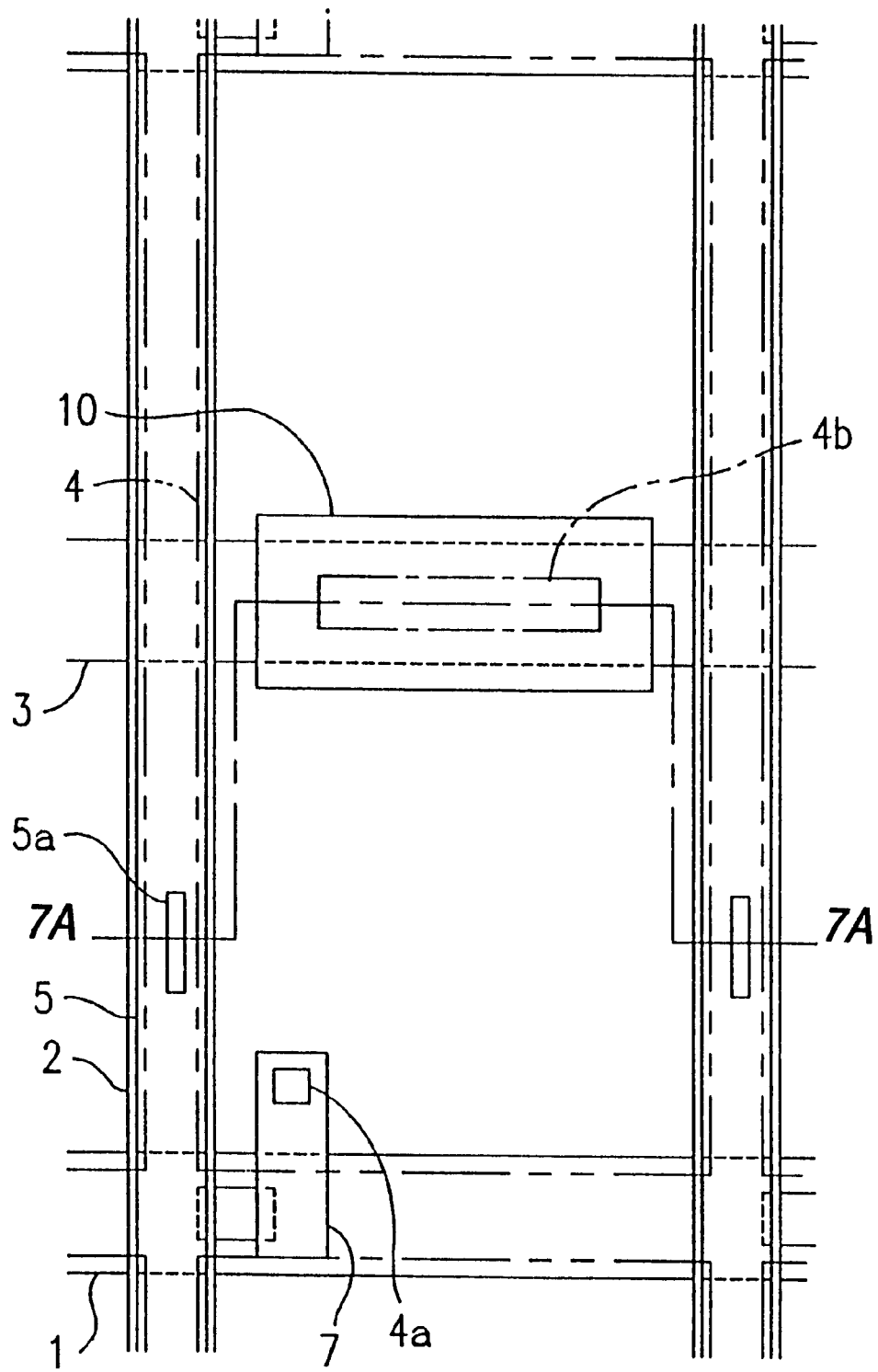
FIG. 2 is a plan view showing the configuration of one pixel of the active matrix substrate in the active matrix display device of Example 1.
Figure 3:
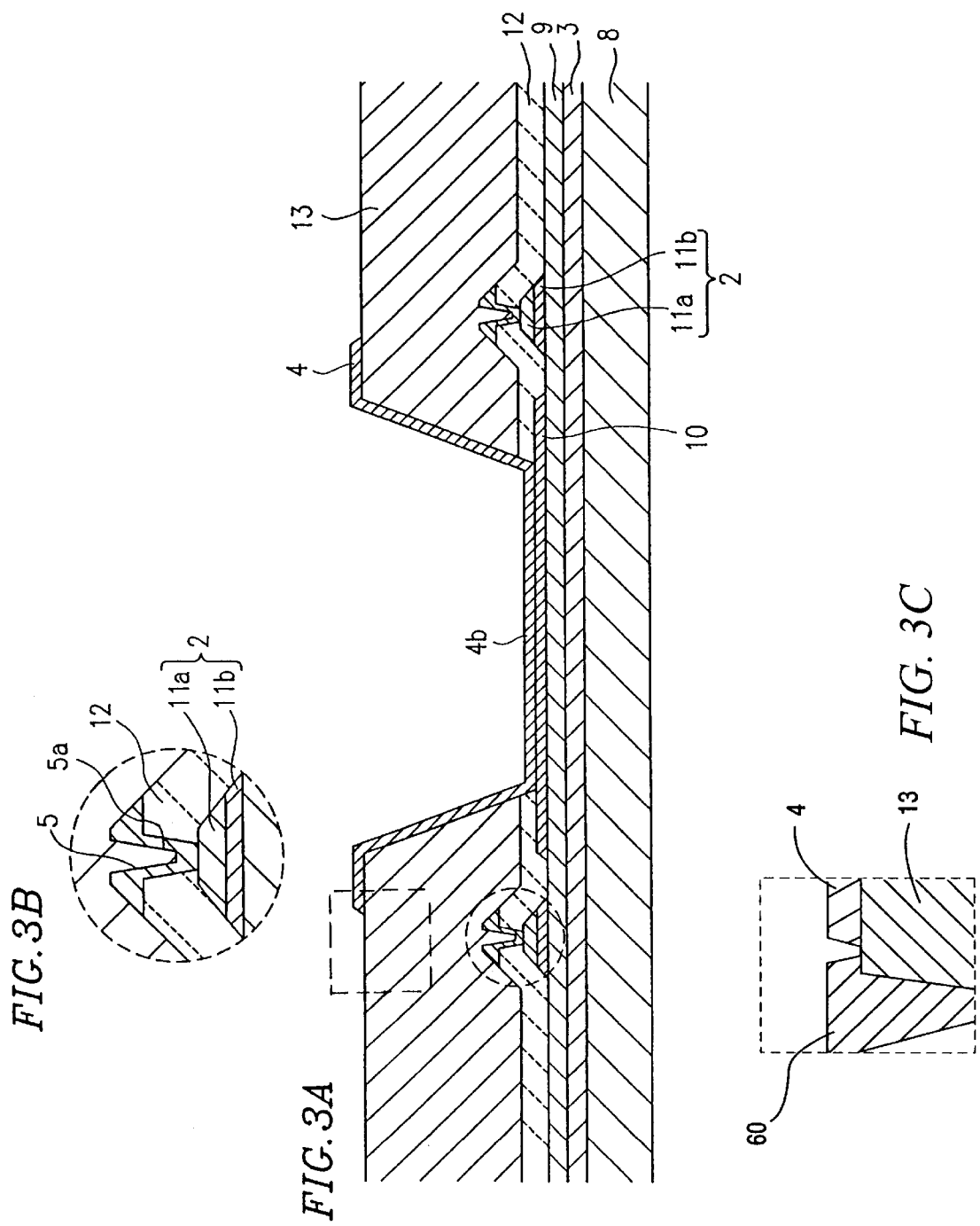
FIG. 3A is a cross-sectional view of the pixel taken along a line A-A' in FIG. 2.
FIG. 3B is an enlarged view of a contact hole.
FIG. 3C is an enlarged view of an alternative contact hole.
Figure 4:
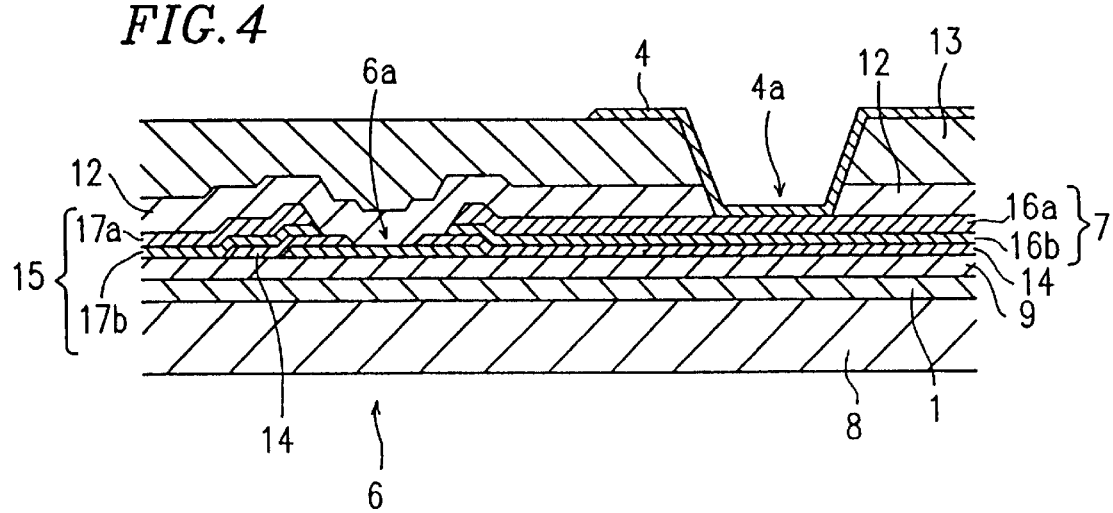
FIG. 4 is a cross-sectional view of a TFT portion of the active matrix display device of Example 1.

FIG. 1A is a plan view showing the configuration of an active matrix substrate in an active matrix display device of Example 1, and FIG. 1B is an enlarged plan view specifically showing a TFT portion of the active matrix substrate of FIG. 1A. FIG. 2 is an enlarged plan view showing the configuration of one pixel of the active matrix substrate shown in FIG. 1A. FIG. 3A is a cross-sectional view of the pixel taken along a line A-A' in FIG. 2, and FIG. 3B is an enlarged view of a contact hole. FIG. 4 is a cross-sectional view of a TFT portion of the active matrix substrate of this example.

In this active matrix substrate, a plurality of gate bus lines 1 are provided as scanning lines on a substrate 8. The gate bus lines 1 are formed so as to correspond to rows of pixels, respectively, as shown in FIG. 1A. A plurality of Cs lines 3 are also formed in the same layer as the data bus lines 2 so that the gate bus lines 1 and the Cs lines 3 are alternately arranged in parallel with each other. Each of the Cs lines 3 is connected to the pixels in the respective row. Cs electrodes 10 are formed for the respective pixels on the Cs lines 3 with a gate insulating film 9 interposed therebetween. On the gate insulating film 9, the data bus lines 2 are disposed to cross the gate bus lines 1. The data bus line 2 has a double-layered structure of a lower data bus line 11b and an upper data bus line 11a. An insulating film 12 is provided to cover the data bus lines 2, and bypass spare lines 5 are provided thereon to respectively overlap the data bus lines 2. A plurality of contact holes 5a are formed through the insulating film 12 in overlapping regions of the data bus lines 2 and the bypass spare lines 5. The data bus lines 2 and the bypass spare lines 5 are connected to each other via the contact holes 5a.

In the vicinity of each intersection of the gate bus lines 1 and the data lines 2 consisting of the lower and upper data bus lines 11b and 11a, a thin film transistor (hereinafter, simply referred to as TFT) 6 is provided as a switching element. As shown in FIG. 4, the TFT 6 includes a semiconductor layer 6a formed on the corresponding gate bus line 1 with the gate insulating film 9 interposed therebetween. The central portion of the semiconductor layer 6a serves as a channel region of the TFT 6, while portions of the semiconductor layer 6a located so as to sandwich the central portion are respectively connected to the upper data bus line 11a of the corresponding data bus lines 2 and a drain electrode 7 via a semiconductor contact layer 14. A portion of the data bus line 2 serves as a source electrode 15, and hence the source electrode 15 consists of a lower source electrode 17b and an upper source electrode 17a. The drain electrode 7 also has a double-layered structure of an upper drain electrode 16a and a lower drain electrode 16b. An interlayer insulating film 13 serving as a second insulating film is provided so as to cover the above-mentioned components, i.e., components of the TFT 6 and the bus lines 2. Furthermore, on the interlayer insulating film 13, a plurality of pixel electrodes 4 are formed in a matrix, as shown in FIG. 1A. Each of the pixel electrodes 4 is connected to the drain electrode 7 via a contact hole 4a formed through the interlayer insulating film 13.

The active matrix substrate having the above-mentioned structure is spaced away from a counter substrate on which a counter electrode is formed (not shown), and the substrates are then attached to each other so as to form a gap therebetween. The gap is filled with a liquid crystal material as a display medium, whereby a liquid crystal display device is completed.

In this liquid crystal display device, when an ON voltage (scan voltage) is applied to a gate bus line 1 on the active matrix substrate, the TFTs 6 in a row corresponding to the gate bus line 1 turn on. Therefore, signal voltages which are applied to data bus lines 2 are supplied to pixel electrodes 4 via the TFTs 6, respectively. As a result, a pixel capacitor formed by each of the pixel electrodes 4 and the counter electrode is charged in accordance with the signal voltages supplied to the pixel electrodes 4.

Next, referring to FIGS. 3A, 3B and 4, the active matrix display device of the present example 1 will be described below.

First, a transparent conductive film is formed on the transparent insulating substrate 8, and is patterned to form the gate bus lines 1 and the Cs lines 3. In this example, a glass substrate was used as the transparent substrate 8. However, any substrate of other material can be used as long as it is transparent and insulative.

Next, an insulating thin film serving as the gate insulating film 9, a semiconductor thin film which is to be patterned to form a semiconductor layer 6a later, and a thin film of a semiconductor-electrode contact material which is to be patterned into semiconductor contact layers 14, are formed in this order, successively. In the present example, the insulating thin film is formed of silicon nitride, and the semiconductor thin film is formed of amorphous silicon. However, any insulating material other than the silicon nitride can be used for forming the insulating thin film. Also, the semiconductor layer 6 can be formed of any semiconductor material other than the amorphous silicon.

Lower and upper conductive thin films are formed in that order on the substrate 8. Then, the upper transparent conductive thin film is patterned to form upper data bus lines 11a, upper drain electrodes 16a, and upper source electrodes 17a which are portions of the upper data bus lines 11a. Then, the lower conductive thin film is patterned into the lower data bus lines 11b, the lower drain electrodes 16b, the lower source electrodes 17b and Cs electrodes 10. Although the lower conductive thin film is formed of ITO, the lower conductive thin film may be formed of any conductive material. Similarly, the upper conductive thin film can be formed of any conductive material, although a metal material including Ta was used in the present example. Alternatively, the data bus lines, the drain and source electrodes may have a single-layer structure of a conductive material, instead of a double layered structure. In this case, any conductive material may be used for forming the single-layer structure. The thicknesses of the upper and lower data bus lines are preferably set to be in a region of 0.5 $\mu$m and the width of the data bus lines 2 are preferably set to be in a region of 8 $\mu$m. In the present example, the thicknesses of the upper and lower data bus lines were set to be 0.5 $\mu$m and 0.5 $\mu$m, respectively, and the width thereof was set to be 8 $\mu$m, considering electrical driving conditions. By above-mentioned steps, the TFTs 6 can be formed.

Next, an insulating film 12 is formed over the entire surface of the substrate 8, and a plurality of contact holes 5a for securing connection of bypass spare lines 5 and the upper data bus lines 2 are formed through the insulating film 12 so as to reach the data bus lines 2. Then, the bypass spare liens 5 are formed on the insulating film 12 along the data bus lines 2. At this time, the bypass spare lines 5 are also formed within the contact holes 5a, so that they are connected to the data bus lines 2. In the present example, the insulating film 12 was formed of silicon nitride. However, any other insulating material can be used for forming the insulating film 12. Preferably, the thickness of the insulating film 12 is set to be between the thickness of the data bus line 2 and about 1 $\mu$m. Moreover, in this example, the bypass spare line 5 is formed by using a Ta type metal material. However, the bypass spare line 5 may be formed of a transparent conductive film such as ITO, an opaque conductive film having a low resistance such as an aluminum film, or other films made of conductive materials. The width of the bypass spare line 5 is set to be a predetermined width smaller than that of the data bus line 2. In this example, the width of the bypass spare line 5 is set at about 7 μm in view of electrical characteristic conditions.

Next, an insulating layer serving as the interlayer insulating film 13 is formed. Then, the contact hole 4a for securing the pixel electrode 4 and the drain electrode 7 and the contact hole 4b for securing the pixel electrode 4 and the Cs electrode 10 are formed through the interlayer insulating film 13. The interlayer insulating film 13 preferably has a thickness in the range of about 1 μm to about 5 μm, more preferably in the range of about 1.5 μm to about 3 μm due to its insulating property. It is preferred to use a material having a low specific dielectricity as the material for the interlayer insulating film 13. Although a photosensitive acrylic resin having a specific dielectricity of 3.5 is formed to a thickness of about 3.0 μm as the interlayer insulating film 13, any other material can be used as long as it has an insulating property. Moreover, the insulating film 12 and the interlayer insulating film 13 may be formed of the same material. It is preferred that at least the insulating film 12 or the interlayer insulating film 13 serving as a second insulating film is an organic insulating film.

Thereafter, the pixel electrode 4 is formed by patterning the conductive film. The pixel electrode 4 is formed inside the contact holes 4a and 4b. The pixel electrodes 4 are connected to the drain electrode 7 and the Cs electrode 10 through the contact holes 4a and 4b. Although the pixel electrode 4 is formed by using ITO in Example 1, any other transparent conductive material may be used. As a result, the active matrix substrate of Example 1 is obtained.

The thus obtained active matrix substrate and the counter substrate on which a counter electrode (not shown) is provided are attached to each other so as to form a predetermined gap therebetween. A liquid crystal material is injected within the gap between the substrates, thereby completing the liquid crystal display device.

The resulting active matrix display device of Example 1 has the following excellent characteristics.

(1) In the case where the data bus line 2 is disconnected, a signal voltage can be applied to the pixel electrode 4 positioned ahead of the disconnected portion through the bypass spare line 5.

(2) In the case where a leak is generated at the intersection between the gate bus line 1 and the data bus line 2, the data bus line 2 is cut at two points with the intersection positioned therebetween, for example, by irradiating a laser beam onto the two points before forming the insulating film 12. As a result, a voltage is not applied to the data bus line 2 at the intersection, and a leak between the gate bus line 1 and the data bus line 2 can be corrected.

(3) Since the bypass spare line 5 does not traverse the pixel electrode 4, the capacitance between the bypass spare line 5 and the pixel electrode 4 is extremely small. As a result, crosstalk due to the bypass spare line 5 rarely occurs.

(4) Since the bypass spare line 5 is formed on the data bus line 2, a leak does not occur at the intersection of the gate bus line 1 and the bypass spare line 5.

(5) In the case where the bypass spare line 5 is formed by using a transparent conductor, the bypass spare line 5 does not block light transmitting through the pixel. Therefore, the aperture ratio can be maintained. Moreover, if the width of the bypass spare line 5 is larger than that of the data bus line 2, the occurrence of disconnection of the bypass spare line 5 is reduced. In the case where the bypass spare line 5 is formed by using an opaque conductor, a material having a low specific resistance can be selected. Therefore, the resistance of the bypass spare line 5 can be lowered. In this case, since the bypass spare line 5 is formed on the data bus line 2, the bypass spare line 5 does not prevent light from transmitting through the pixel. As a result, the aperture ratio of the pixels can be maintained.

(6) The portions of the data bus line 2 corresponding to the adjacent pixel electrodes 4 can be connected to each other by the bypass spare lines 5. Therefore, even if the disconnection occurs at any position of the data bus line 2, a signal voltage can be applied to the pixel electrode 4 positioned ahead of the disconnected portion through the bypass spare line 5.

(7) Since the pixel electrode 4 is formed on the interlayer insulating film 13 made of an organic insulating film, the capacitance between the pixel electrode 4 and the data bus line 2 can be reduced. Accordingly, the capacitance between the gate bus line 1 and the pixel electrode 4 can be also reduced.

(8) In the case where an organic insulating film is used as the insulating film 12 covering the data bus lines 2, the disconnection of the bypass spare line 5 rarely occurs because the bypass spare line 5 is formed on the planar organic insulating film.

(9) Since the bypass spare line 5 is formed on the insulating film 12 covering the data bus line 2, and the pixel electrode 4 is formed on the second insulating film 13 covering the bypass spare line 5, a leak between the pixel electrode 4 and the bypass spare line 5 seldom occurs.

Although the bypass spare line 5 is formed for each of the data bus lines 2 in FIG. 1, the bypass spare line 5 may be formed only on the data bus line 2 where the disconnection of the data bus line 2 or a leak occurs between the gate bus line 1 and the data bus line 2 occurs. Accordingly, it is not necessary to form the bypass spare line 5 on the regions free from such disconnections or leaks. By omitting the formation of the insulating film 12 and the bypass spare line 5 in this manner, the fabrication time and fabrication cost can be reduced.

Figure 5:
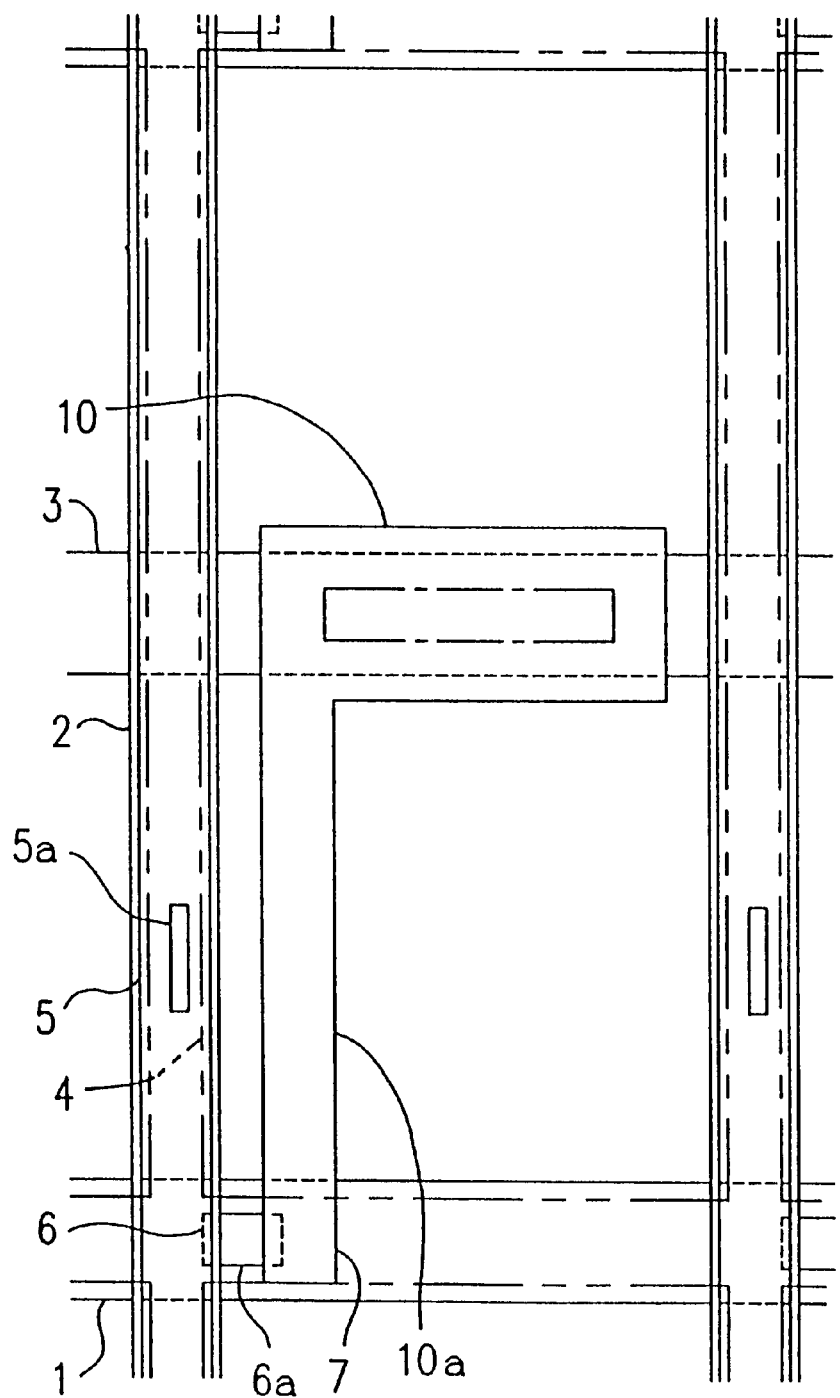
FIG. 5 is a plan view showing another configuration of the active matrix substrate of the active matrix display device of Example 1.

Although the pixel electrode 4 and the drain electrode 7 are directly connected to each other in FIG. 1, the pixel electrode 4 and the drain electrode 7 may be connected to each other via the Cs electrode 10 and a connection electrode 10a as shown in FIG. 5.

Figure 6:
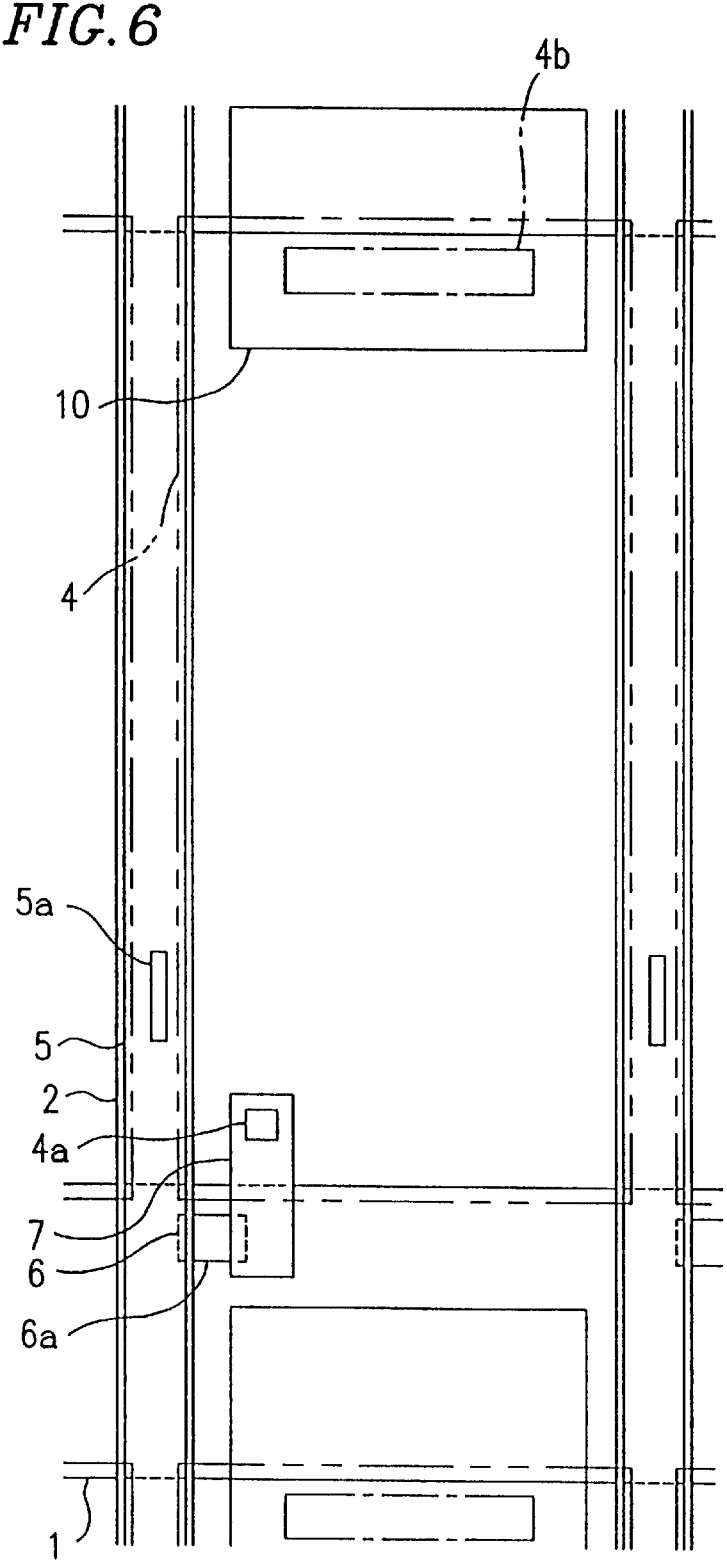
FIG. 6 is a plan view showing still another configuration of the active matrix substrate of the active matrix display device of Example 1.

The Cs electrode 10 is provided on the Cs line 3 common to the respective pixels so as to form a storage capacitor at the overlapping portion of the Cs line 3, the gate insulating film 9, and the Cs electrode 10 in FIG. 1. Specifically, the storage capacitor is formed so as to have a Cs on Common structure. Alternatively, the active matrix substrate may have a Cs on Gate structure as shown in FIG. 6. Specifically, the Cs electrode 10 is formed to partially overlap the gate bus line 1 corresponding to the adjacent pixel electrodes 4, thereby forming a storage capacitor at the overlapping portion of the gate bus line 1, the gate insulating film 9, and the Cs electrode 10.

Figure 7B:
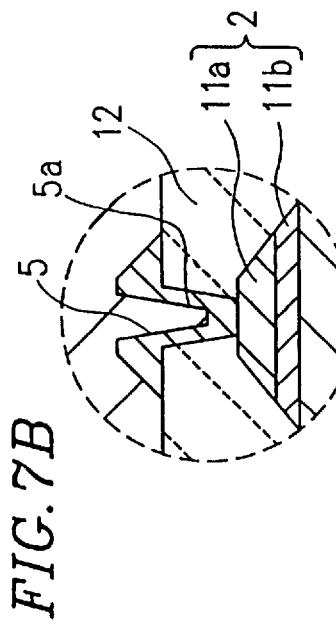
FIG. 7B is an enlarged plan view of a contact hole formed in the active matrix substrate of FIG. 2.
Figure 7A:
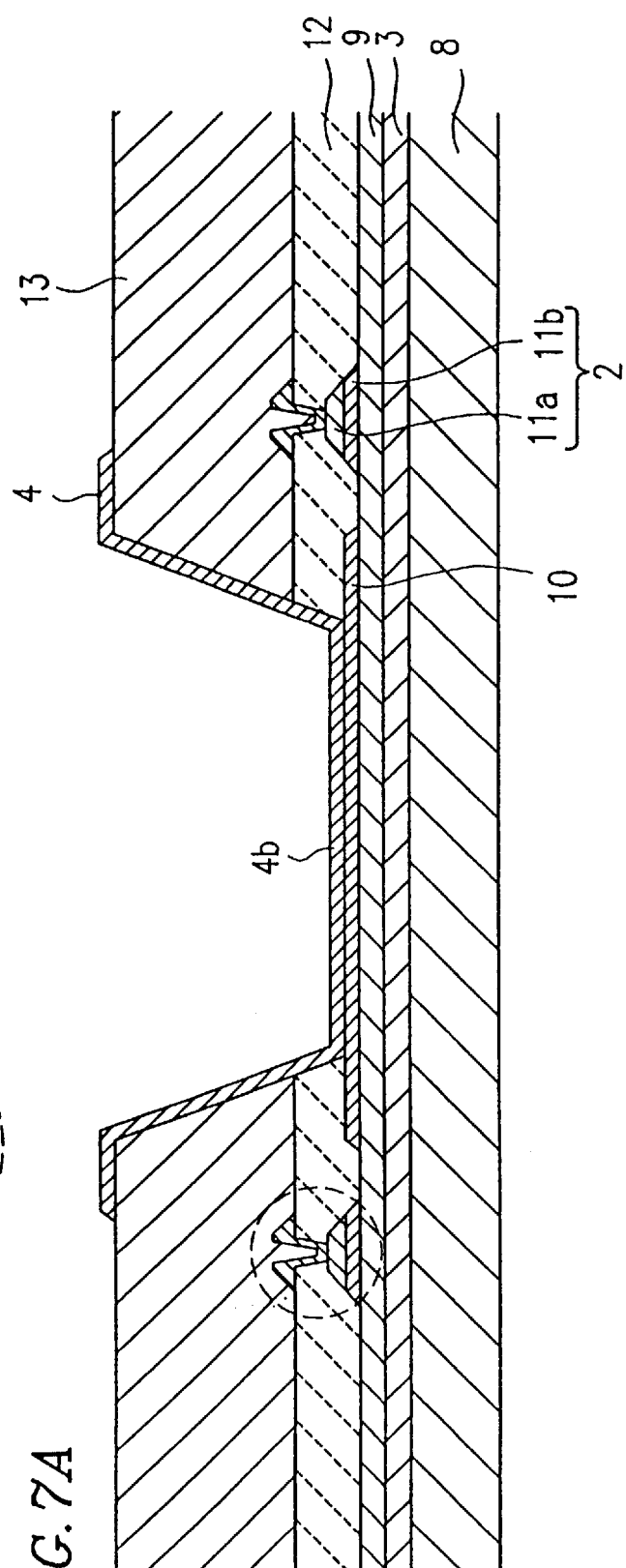
FIG. 7A is a cross-sectional view taken along a line A-A' in FIG. 2 showing another structure of the active matrix substrate in the active matrix display device of Example 1.

Furthermore, the upper surface of the insulating film 12 may be flattened as shown in FIGS. 7A and 7B so as to form the bypass spare line 5 thereon. Such a configuration has an advantage in that the occurrence of disconnection of the bypass spare line 5 is reduced.

Example 2

An active matrix display device of Example 2 will be described with reference to FIG. 8. In Examples 2, 3 and 4 described below, the components having the same functions as those of Example 1 are denoted by the same reference numerals, and the description thereof is herein omitted.

Figure 8:
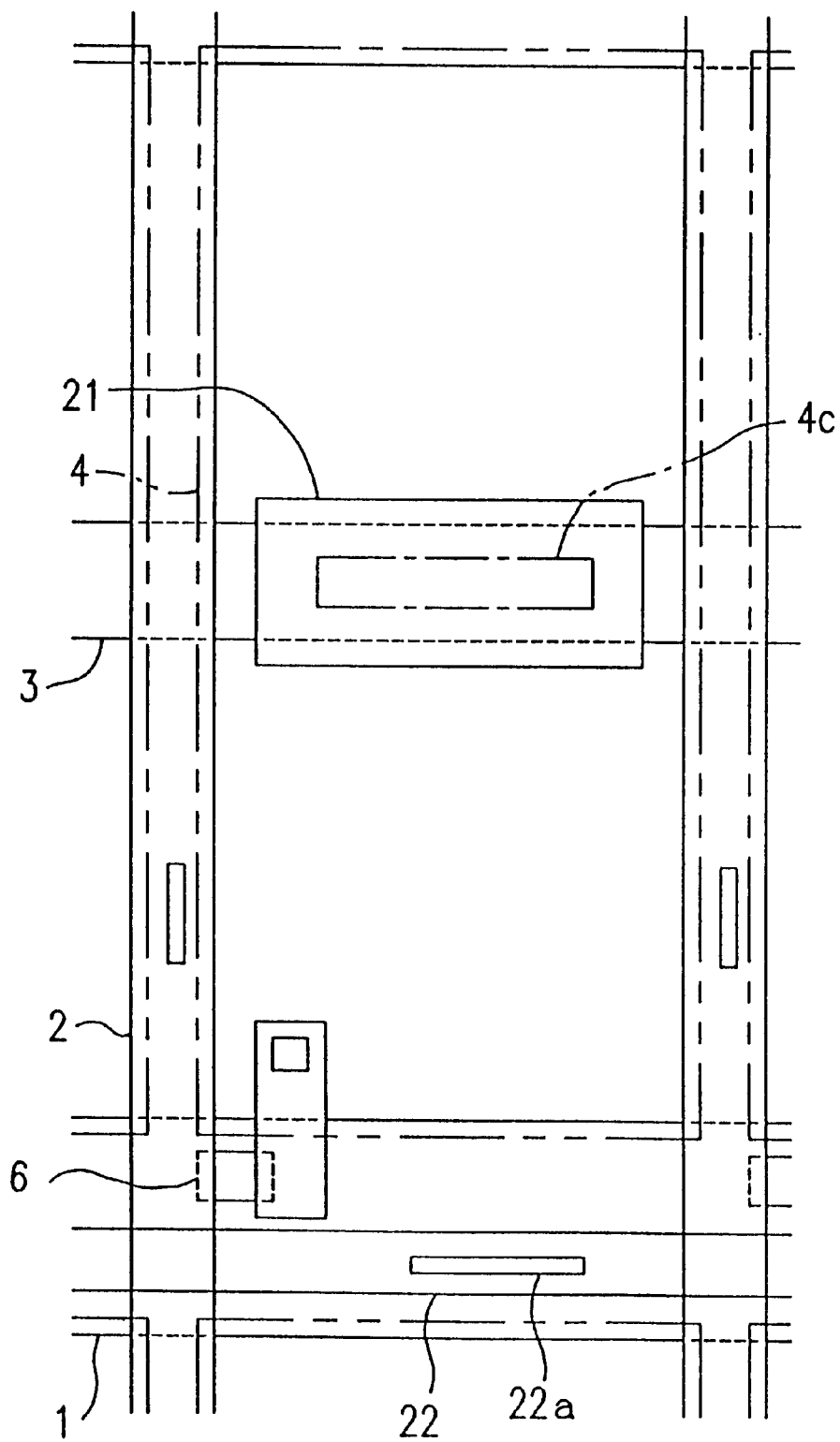
FIG. 8 is a plan view showing the configuration of one pixel of the active matrix substrate in the active matrix display device of Example 2.

FIG. 8 is a plan view showing the configuration of one pixel of the active matrix substrate in the active matrix display device of Example 2.

In this active matrix substrate, the gate bus lines 1, the data bus lines 2, and the Cs lines 3 are arranged in the same manner as that of Example 1.

A Cs electrode 21 is formed on the Cs line 3 with a gate insulating film (not shown) interposed therebetween. As a result, a storage capacitor is formed so as to have a Cs on Common structure. The Cs electrode 21 is connected to the pixel electrode 4 via a contact hold 4c formed through the gate insulating film.

On the insulating film 12 formed so as to cover the above-mentioned components, a bypass spare line 22 is formed so as to overlap the gate bus line 1. A contact hole 22a is formed at the position of the gate bus line 1 corresponding to each of the pixel electrodes 4. The gate bus line 1 and the bypass spare line 22 are connected to each other via the contact hole 22a. The bypass spare line 22 is formed to have a predetermined width smaller than that of the gate bus line 1. The bypass spare line 22 may be formed of a transparent conductive film such as ITO, an opaque conductive film having a low resistance such as an aluminum film, or any other films made of conductive materials.

The same TFTs 6 as those of Example 1 are provided in the vicinity of intersections between the gate bus lines 1 and the data bus lines 2.

The pixel electrode 4 is formed on a second insulating film (not shown) provided so as to cover these components.

The active matrix display device of Example 2 can be formed in the same manner as that of Example 1 except that the step of forming the bypass spare line 22 on the insulating film 12 is added while the step for forming the bypass spare line 5 on the insulating film 12 is omitted.

The resulting active matrix display device of Example 2 has the following excellent characteristics.

(1) In the case where the gate bus line 1 is disconnected, a signal voltage can be applied to the pixel electrode 4 positioned ahead the disconnected portion through the bypass spare line 22.

(2) In the case where a leak is generated at the intersection between the gate bus line 1 and the data bus line 2, the gate bus line 1 is cut at two points with the intersection sandwiched therebetween, for example, by irradiating a laser beam onto the two points before forming the insulating film 12. As a result, since a voltage is not applied to the gate bus line 1 at the intersection, a leak between the gate bus line 1 and the data bus line 2 can be corrected.

93) Since the bypass spare line 22 does not traverse the pixel electrode 4, the capacitance between the bypass spare line 22 and the pixel electrode 4 is extremely small. As a result, the lead-in of a pixel voltage due to the capacitance rarely occurs. The leading of the pixel voltage indicates the phenomenon occurring where a capacitor Cgd, having the capacitance described above, between the gate and the drain (pixel) increases. More specifically, when the gate is turned ON, and is then turned OFF after electrically charging the pixel, a pixel potential is lead in the gate via the capacitor Cgd. As a result, the pixel potential is lowered. If such lead-in of the pixel voltage occurs, a DC component is supplied to the liquid crystal material interposed between the pixel electrode and the common electrode, thereby adversely affecting the liquid crystal material. In order to prevent such a phenomenon, the DC components are cancelled by optimizing the potential to be applied to the common electrode.

(4) In the case where the bypass spare line 22 is formed by using a transparent conductor, the bypass spare line 22 does not block light transmitting through the pixel. Therefore, the aperture ratio can be maintained. Moreover, a width of the bypass spare line 22 may be larger than that of the data bus line 2. In such a case, the occurrence of disconnections of the bypass spare line 22 can be reduced. In the case where the bypass spare line 22 is formed by using an opaque conductor, a material having a low specific resistance can be selected. Therefore, the resistance of the bypass spare line 22 can be lowered. In this case, since the bypass spare line 22 is formed on the gate bus line 1, the bypass spare line 22 does not prevent light from being transmitted through the pixel. As a result, the aperture ratio of the pixels can be maintained.

(5) The portions of the gate bus line 1 corresponding to the adjacent pixel electrodes 4 can be connected to each other by the bypass spare lines 22. Therefore, even if the disconnection occurs at any other position of the gate bus line 1, a signal voltage can be applied to the pixel electrode 4 positioned ahead of the defective portion through the bypass spare line 22.

(6) Since the pixel electrode 4 is formed on the interlayer insulating film 13 made of an organic insulating film, the capacitance between the pixel electrode 4 and the data bus line 2 can be reduced. Accordingly, the capacitance between the gate bus line 1 and the pixel electrode 4 can be also reduced.

(7) In the case where an organic insulating film is used as the insulating film 12 covering the gate bus line 1, the disconnection of the bypass spare line 22 seldom occurs because the bypass spare line 22 is formed on the planar organic insulating film 12.

(8) Since the bypass spare line 22 is formed on the insulating film 12 covering the gate bus lines 1, and the pixel electrodes 4 are formed on the second insulating film 13 covering the bypass spare lines 22, a leak between the pixel electrodes 4 and the bypass spare lines 22 seldom occurs.

Although the bypass spare line 22 is formed for each of the gate bus lines 1 in FIG. 8, the bypass spare line 22 may be formed only on the gate bus line 1 where a disconnection of the gate bus line 1 or a leak at the intersection of the gate bus line 1 and the data bus line 2 occurs. In this case, it is not necessary to form the bypass spare line 22 on the region free from such disconnections or leaks. By omitting the formation of the insulating film 12 and the bypass spare line 22 in this manner, the fabrication time and fabrication cost can be reduced.

Figure 9:
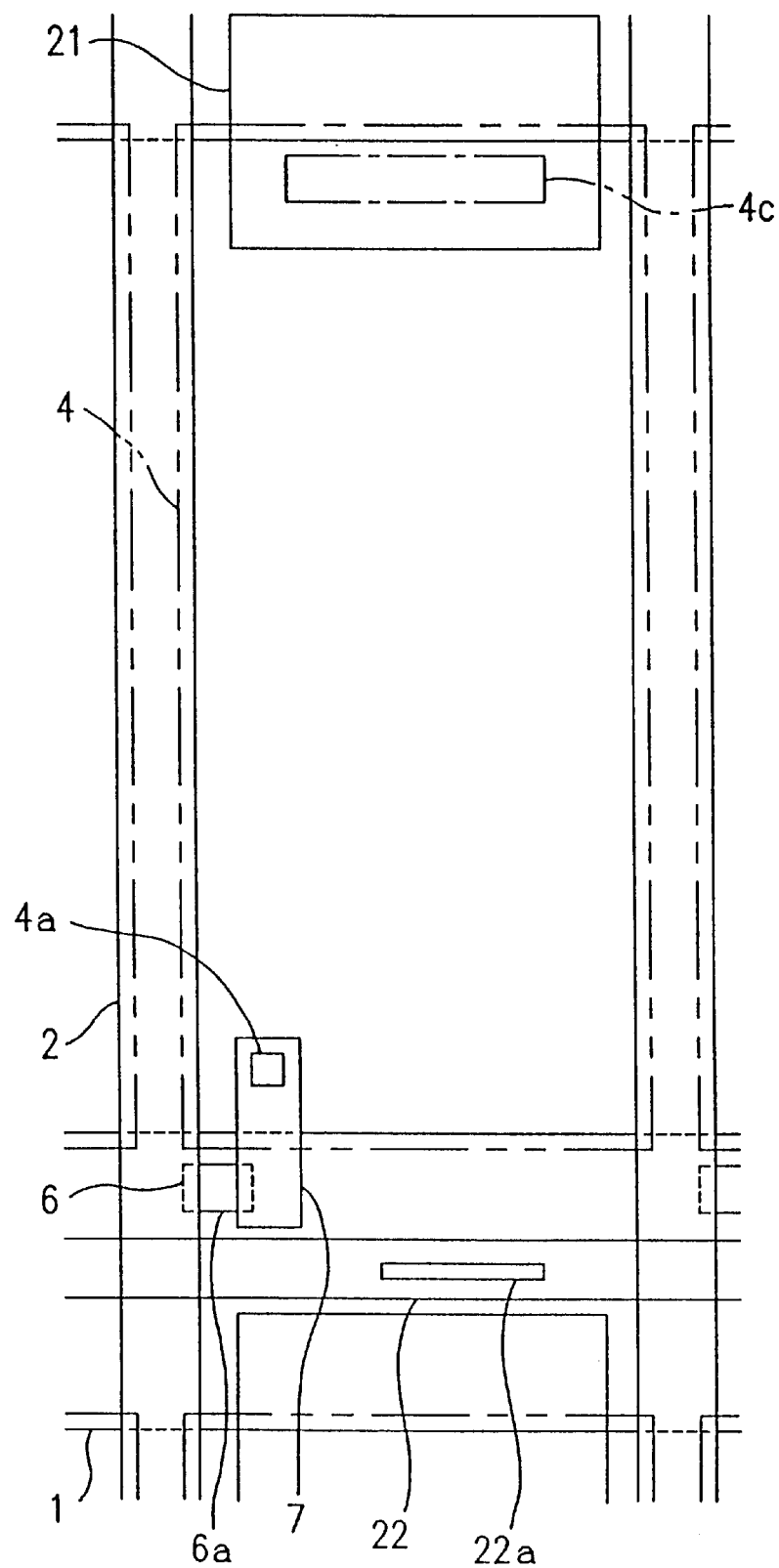
FIG. 9 is a plan view showing another configuration of the active matrix substrate in the active matrix display device of Example 2.

In FIG. 8, the storage capacitor is formed so as to have a Cs on Common structure. Specifically, the Cs electrode 21 is provided on the Cs line 3 common to the respective pixels so that the overlapping portion of the Cs line 3, the gate insulating film 9, and the Cs electrode 21 serves as a storage capacitor. Alternatively, the storage capacitor may be formed so as to have a Cs on Gate structure as shown in FIG. 9. Specifically, the Cs electrode 21 is formed to partially overlap the gate bus line 1 corresponding to the adjacent pixel electrodes 4, so that the overlapping portion of the gate bus line 1, the gate insulating film 9 and the Cs electrode 21 serves as a storage capacitor.

Furthermore, in addition to the configuration shown in FIG. 8, the bypass spare line 5 similar to that of Example 1 may be formed so as to be connected to the data bus line 2 through the contact hole 5a formed through the insulating film 12.

Example 3

An active matrix display device of Example 3 will be described with reference to FIG. 10.

Figure 10:
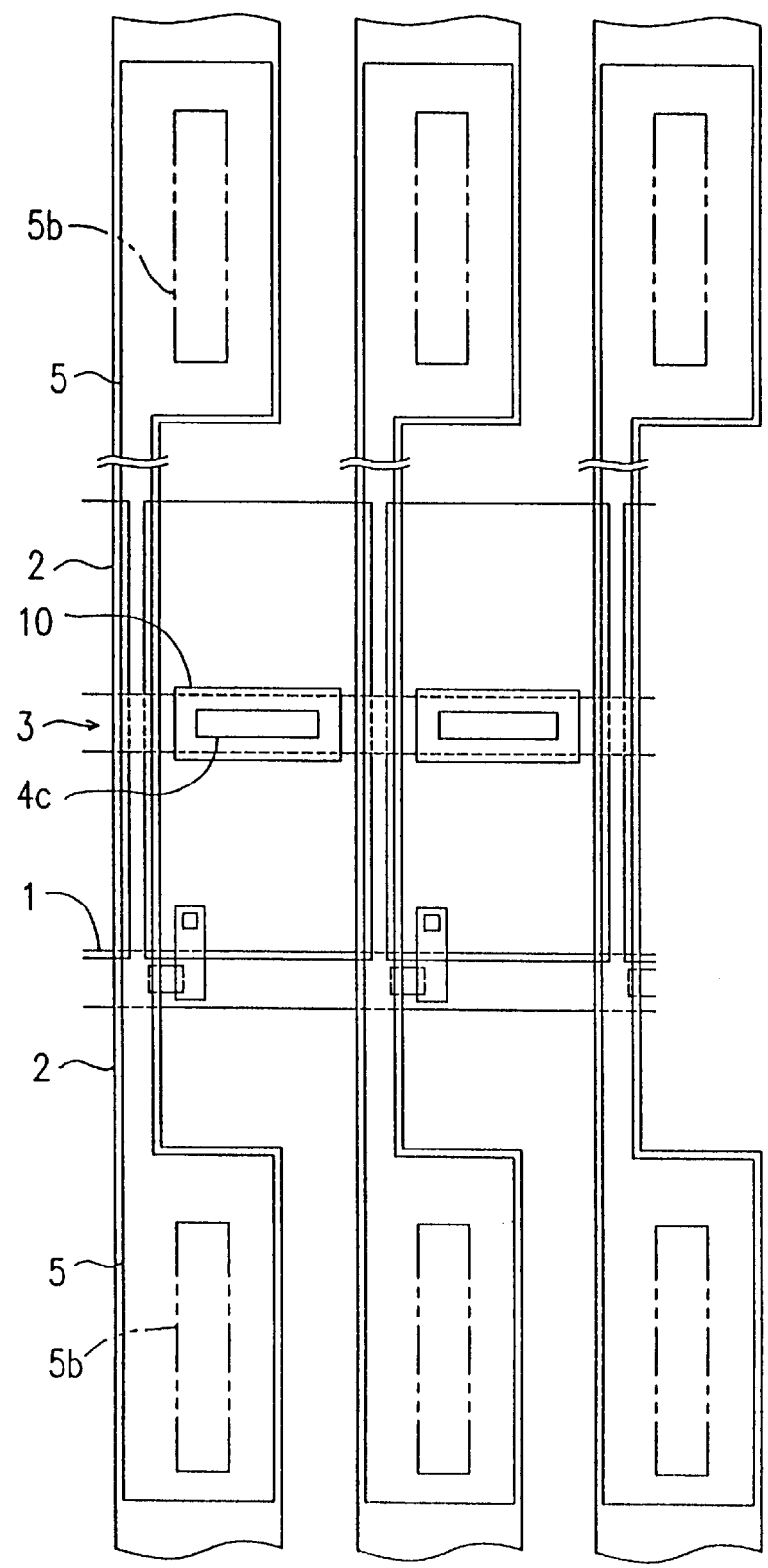
FIG. 10 is a plan view showing the configuration of one pixel of the active matrix substrate in the active matrix display device of Example 3.

FIG. 10 is a plan view showing the structure of an active matrix substrate of the active matrix display device of Example 3.

The active matrix substrate shown in FIG. 10 has the same configuration as that of Example 1 except that a contact hold 5b is formed in a region other than a display region instead of forming the contact hold 5a for connecting the bypass spare line 5 and the data bus line 2 to each other. Terminals connected to two contact holes 5b are herein referred to as an input terminal and an opposite input terminal, respectively. In this case, a signal voltage is input through the input terminal to transmit through the data bus line 2. Just before reaching the disconnected portion, the signal voltage changes its path through the contact hold 5b on the input terminal side to transmit through the bypass spare line 5. As a result, the signal voltage transmits to the portion of the data bus line 2 positioned ahead of the disconnected portion via the contact hold 5b on the opposite input terminal side. Therefore, a normal display state is obtained.

Besides the excellent characteristics of the active matrix display device described in Example 1, the active matrix display device of Example 3 has the following additional excellent characteristics.

(1) The contact holes 5b are formed in a region other than the display region where the pixel electrodes 4 are not formed. Therefore, it is possible to increase the area of contact between the bypass spare line 5 and the data bus line 2 by increasing the width of the data bus line 2 at the position where the contact hold 5b is formed. As a result, the connection resistance between the data bus line 2 and the bypass spare line 5 can be lowered to improve a reliability of the connection.

(2) By minimizing the number of contact portions between the data bus lines 2 and the bypass spare lines 5, a yield of acceptable contact portions can be improved.

(3) If the number of contact portions is limited to two so as to be formed at positions other than a display region, it is necessary to lower a resistance of the bypass spare line 5. The bypass spare lines 5 are formed in a layer different from the layer which includes the gate bus lines 1 and the data bus lines 2. Therefore, it is not necessary to use the same conductive film as that used for the gate bus lines 1 and the data bus lines 2. Therefore, by selecting a material having a low specific resistance such as aluminum, the resistance of the bypass spare line 5 can be lowered.

Figure 11:
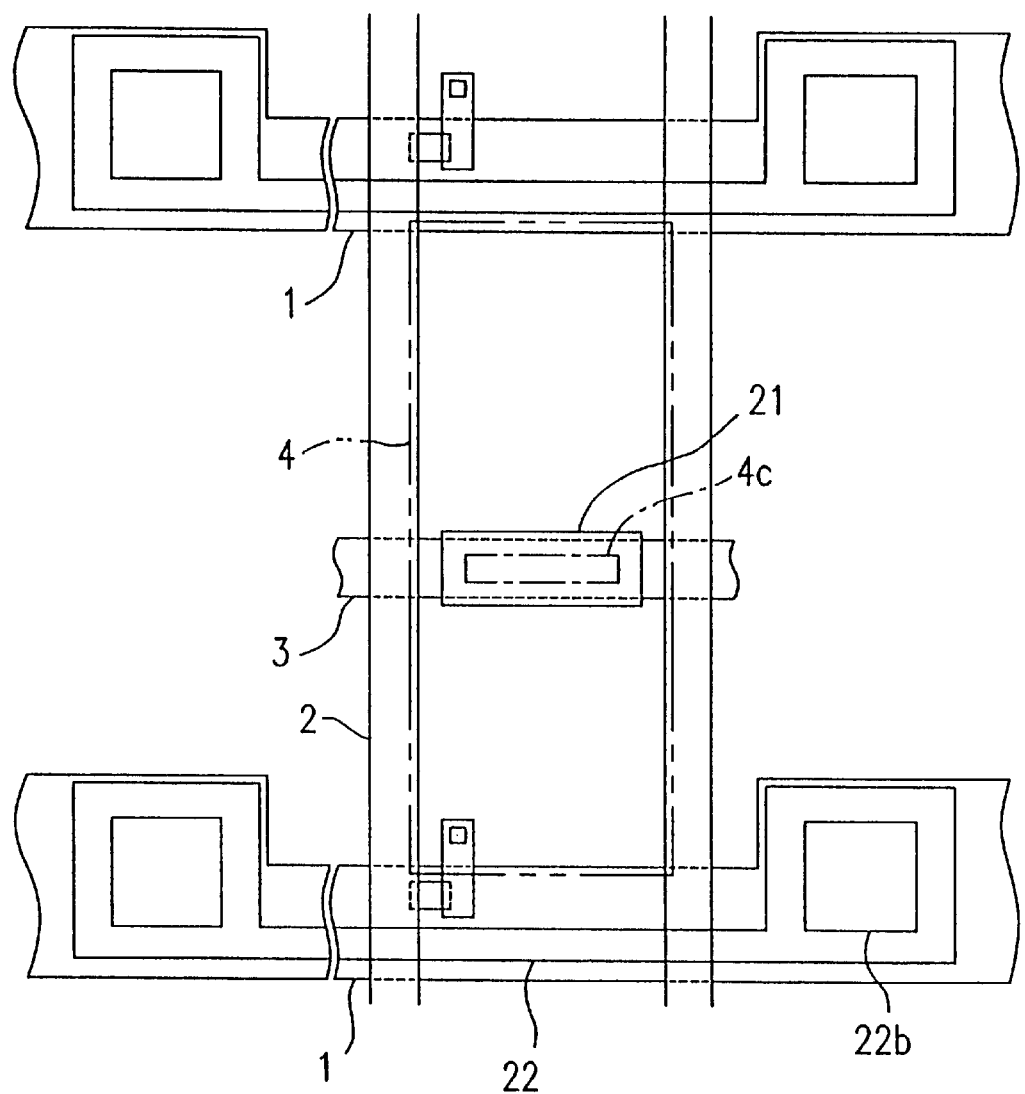
FIG. 11 is a plan view showing another configuration of the active matrix substrate in the active matrix display device of Example 3.

The contact hold 5b for securing the connection between the bypass spare line 5 and the data bus line 2 is provided in a region other than the display region in FIG. 10. A contact hold 22b for securing the connection between the bypass spare line 22 and the gate bus line 1 may be formed in a region other than the display region as shown in FIG. 11. In such a case, the remaining configuration may be the same as that of Example 2.

The bypass spare line 5 shown in FIG. 10 and the bypass spare line 22 shown in FIG. 11 may be both formed on the substrate 8. With such a configuration, the bypass spare line 5 and the bypass spare line 22 may be respectively connected to the data bus line 2 and the gate bus line 1 via the contact holes 5b and 22b formed through the respective insulating films 12.

In Example 3, the storage capacitor is formed so as to have a Cs on Common structure. Specifically, the Cs electrode 10 or 21 is provided on the Cs line 3 common to the respective pixels so that the overlapping portion of the Cs line 3, the gate insulating film, and the Cs electrode 10 or 21 serves as a storage capacitor. Alternatively, the storage capacitor may be formed so as to have a Cs on Gate configuration. In such a Cs on Gate configuration, the Cs electrode 10 or 21 is formed so as to partially overlap the gate bus lines 1 corresponding to the adjacent pixel electrode 4 so that the overlapping portion of the gate insulating film and the Cs electrode 10 or 21 serves as a storage capacitor.

Example 4

An active matrix display device of Example 4 and a method for correcting a defect thereof will be described with reference to FIGS. 12, 13A to 13C, and 14.

Figure 12:
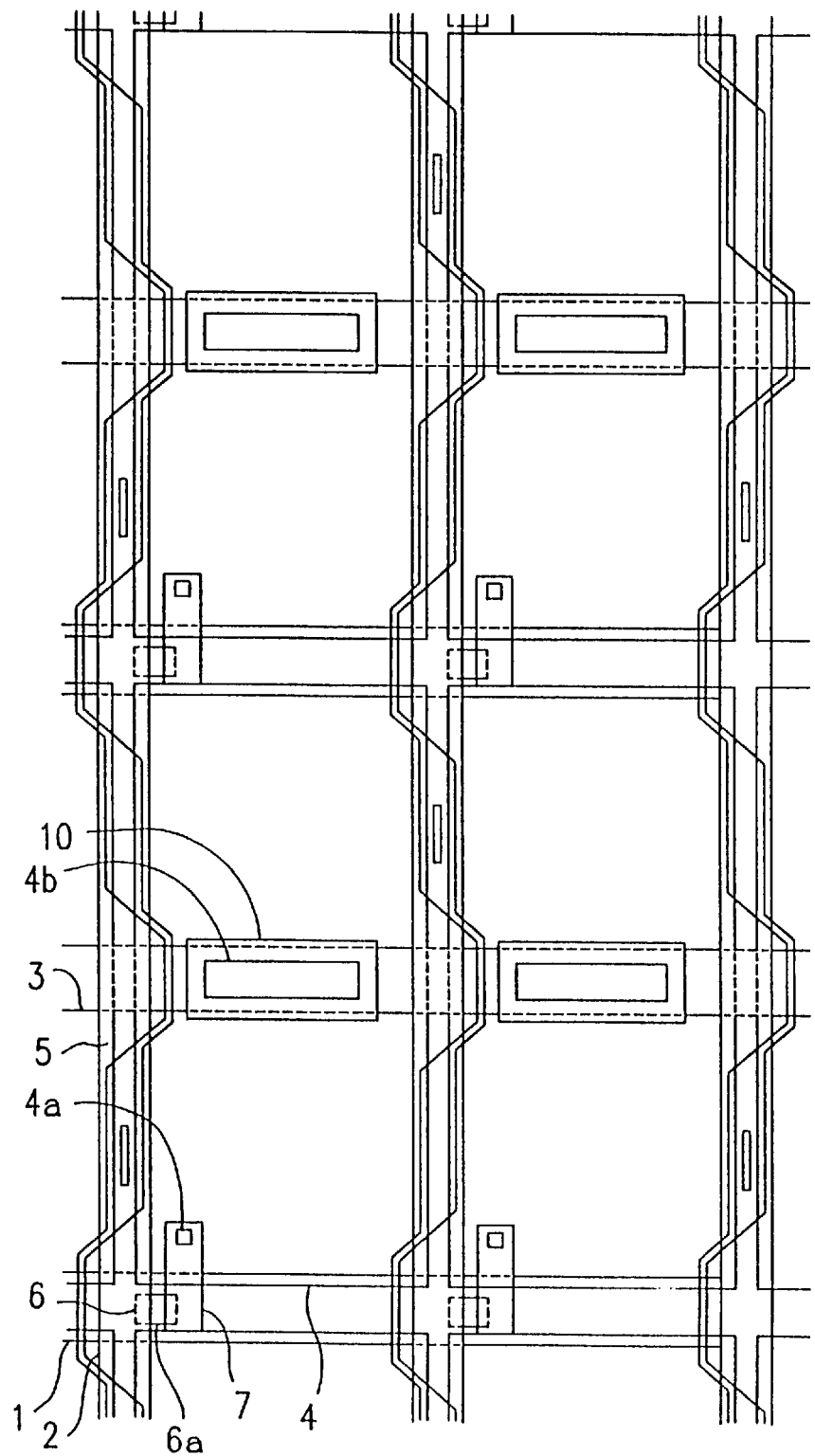
FIG. 12 is a plan view showing the configuration of one pixel of the active matrix substrate in the active matrix display device of Example 4.

FIG. 12 is a plan view showing the configuration of the active matrix substrate in the active matrix display device of Example 4.

Figure 13A:
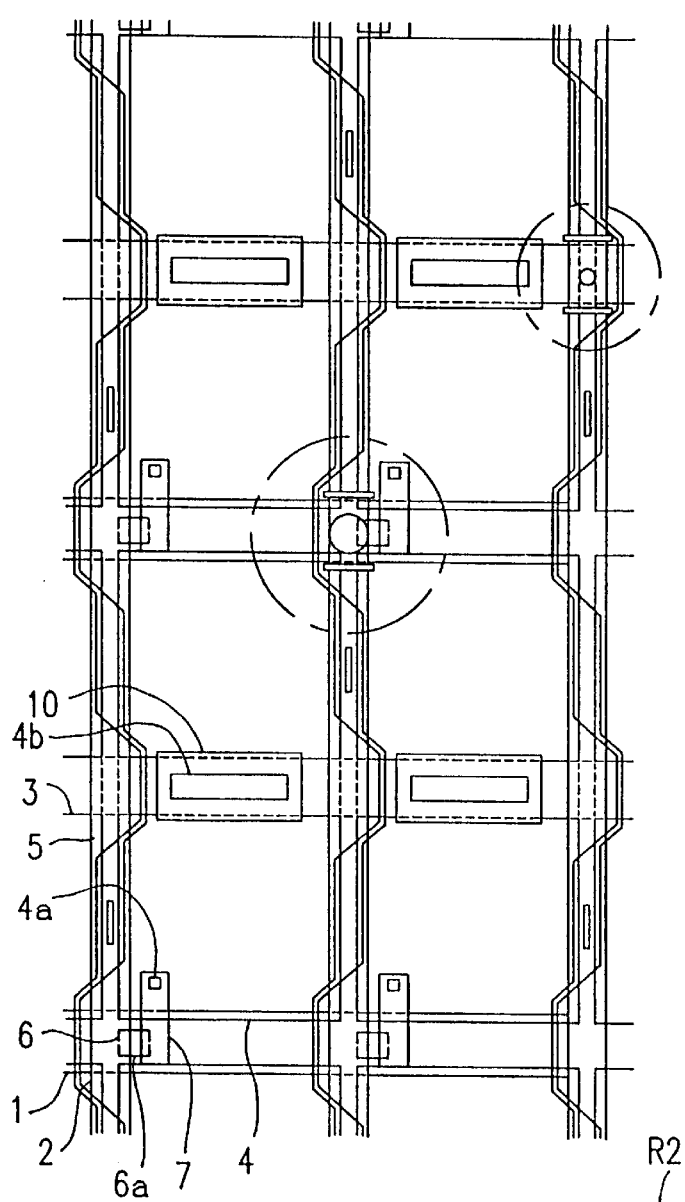
FIGS. 13A to 13C are plan views illustrating a method for correcting a defect in the case where a leak occurs in the active matrix display device of Example 4.
Figure 13C:
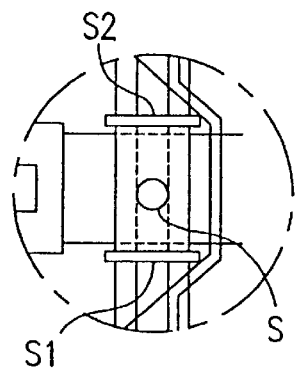
Figure 13B:
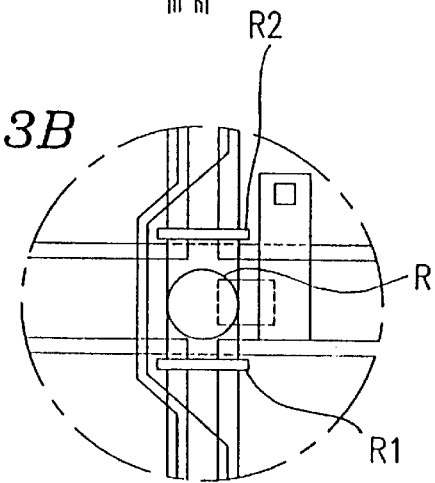
Figure 14:
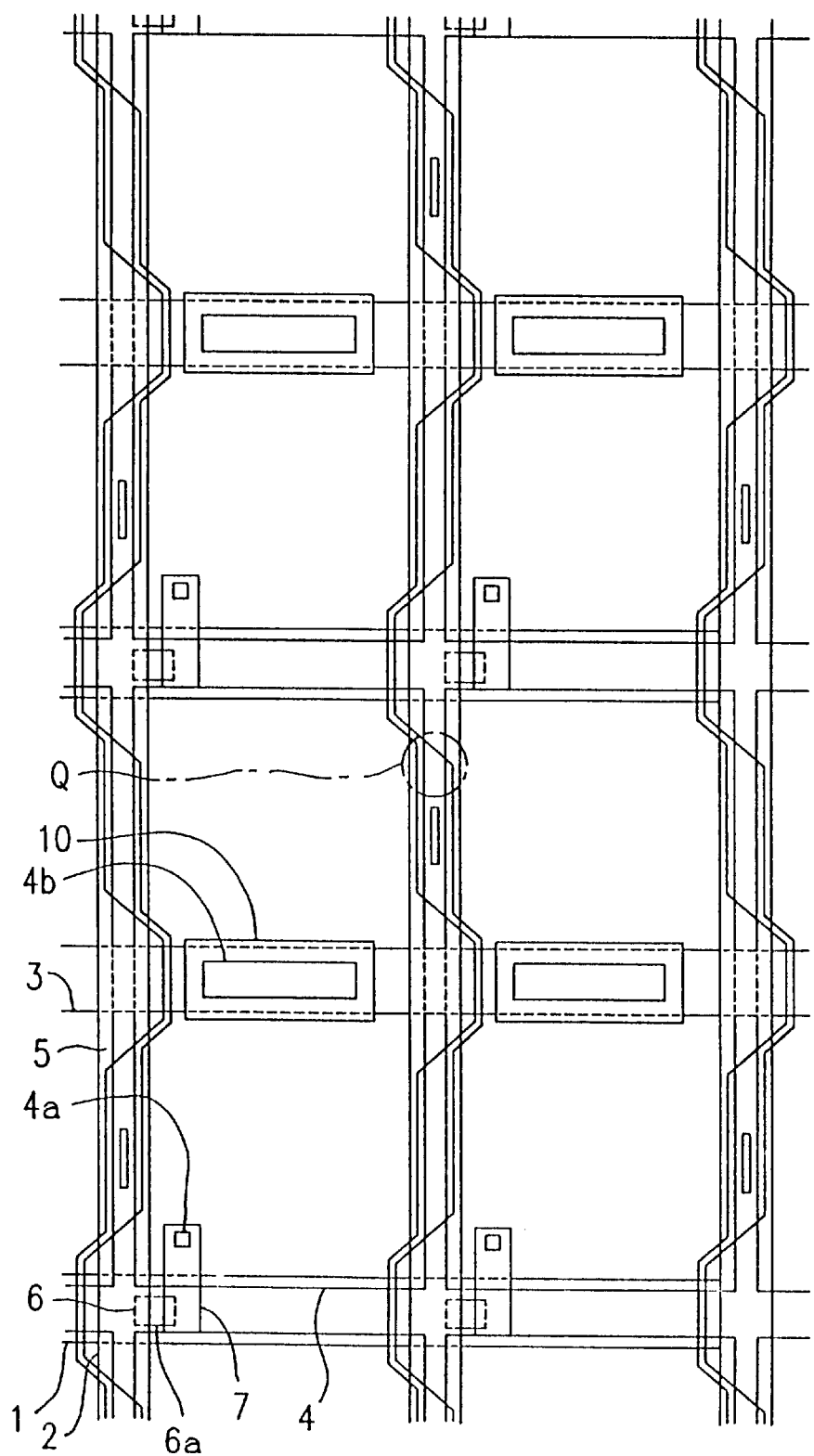
FIG. 14 is a plan view illustrating the case where a disconnection occurs in the active matrix display device of Example 4.
Figure 15:
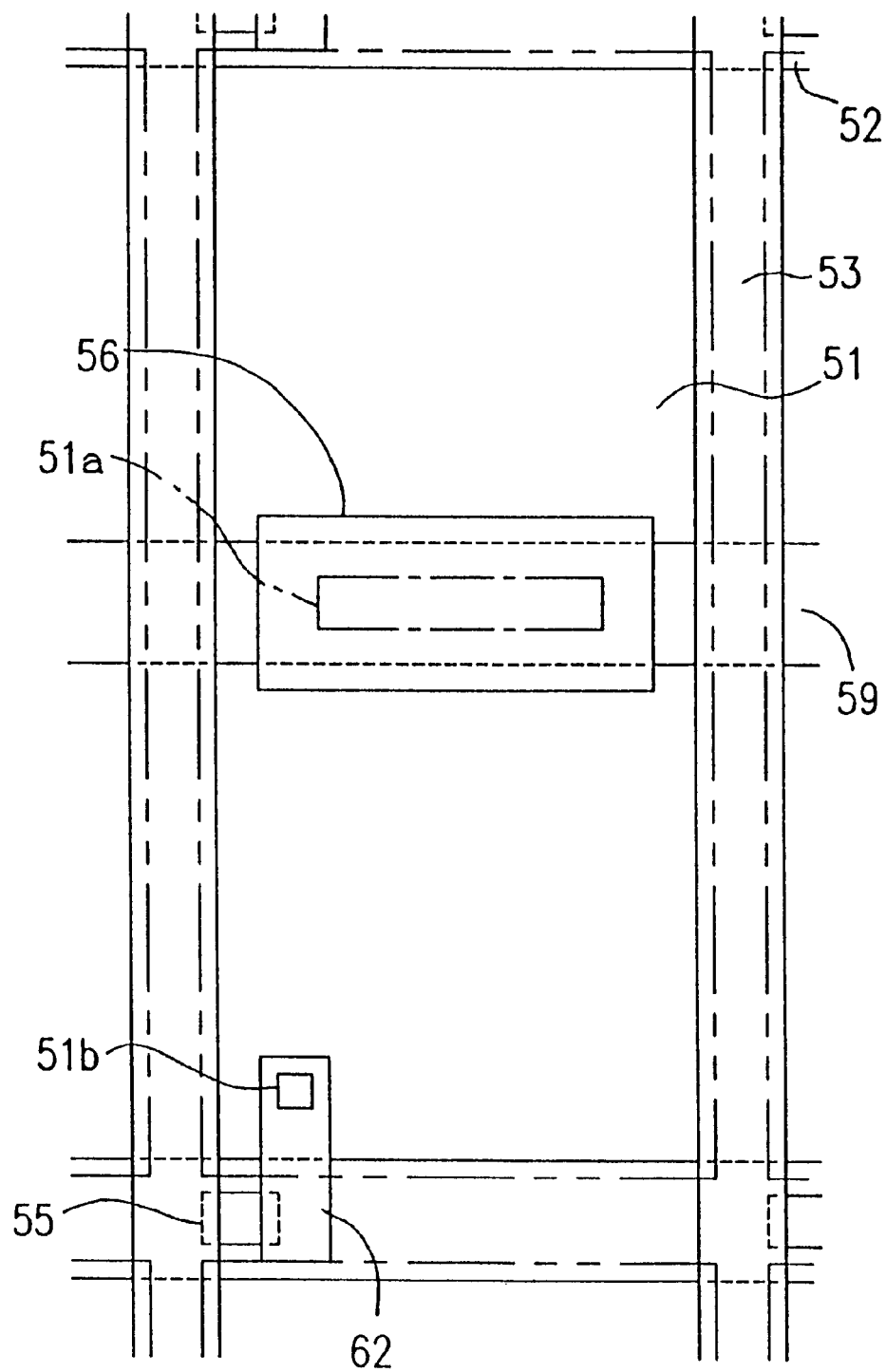
FIG. 15 is a plan view showing the configuration of one pixel of the active matrix substrate in a conventional active matrix display device.
Figure 16:
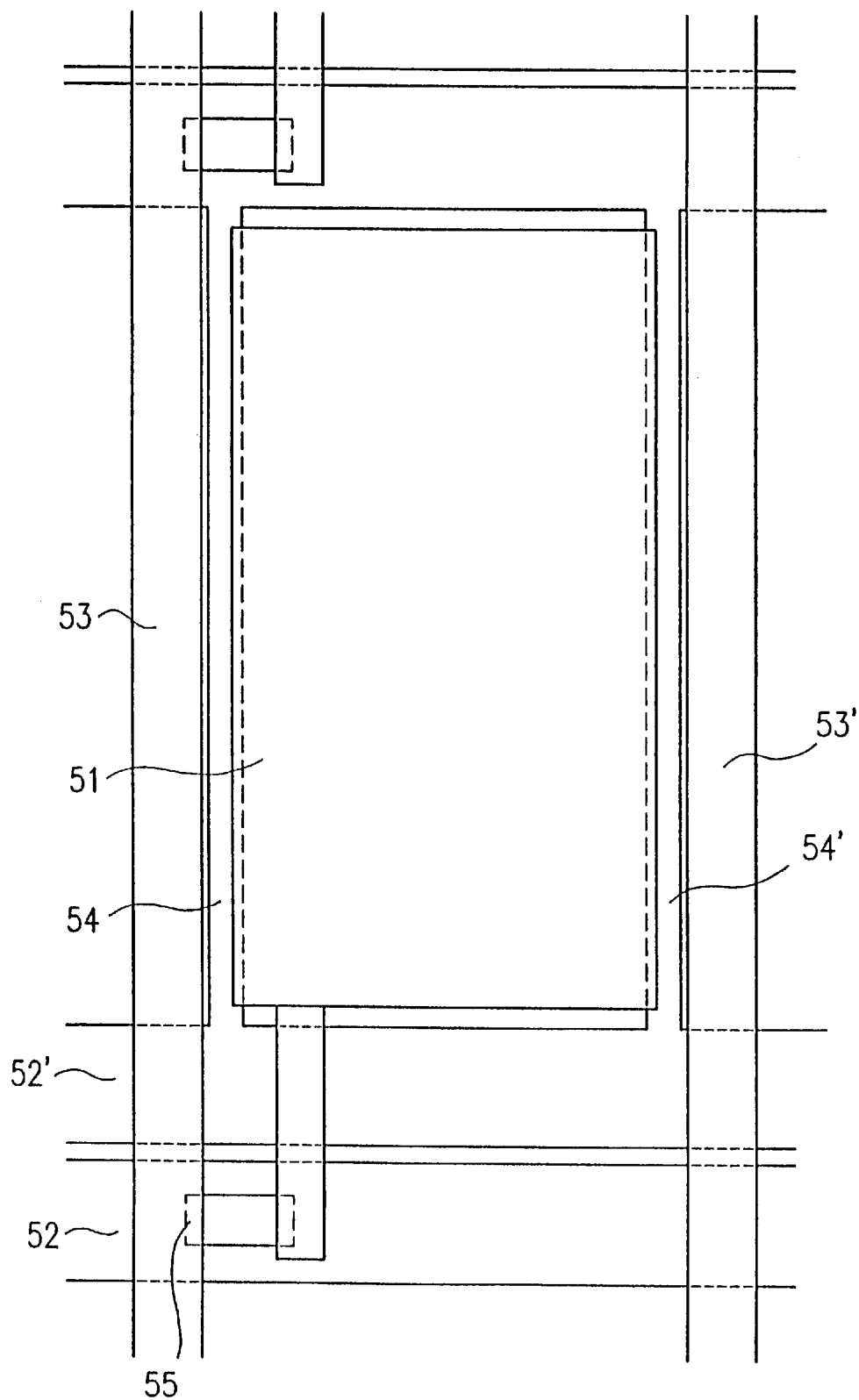
FIG. 16 is a plan view showing the configuration of one pixel of the active matrix substrate in a conventional active matrix display device.
Figure 17:
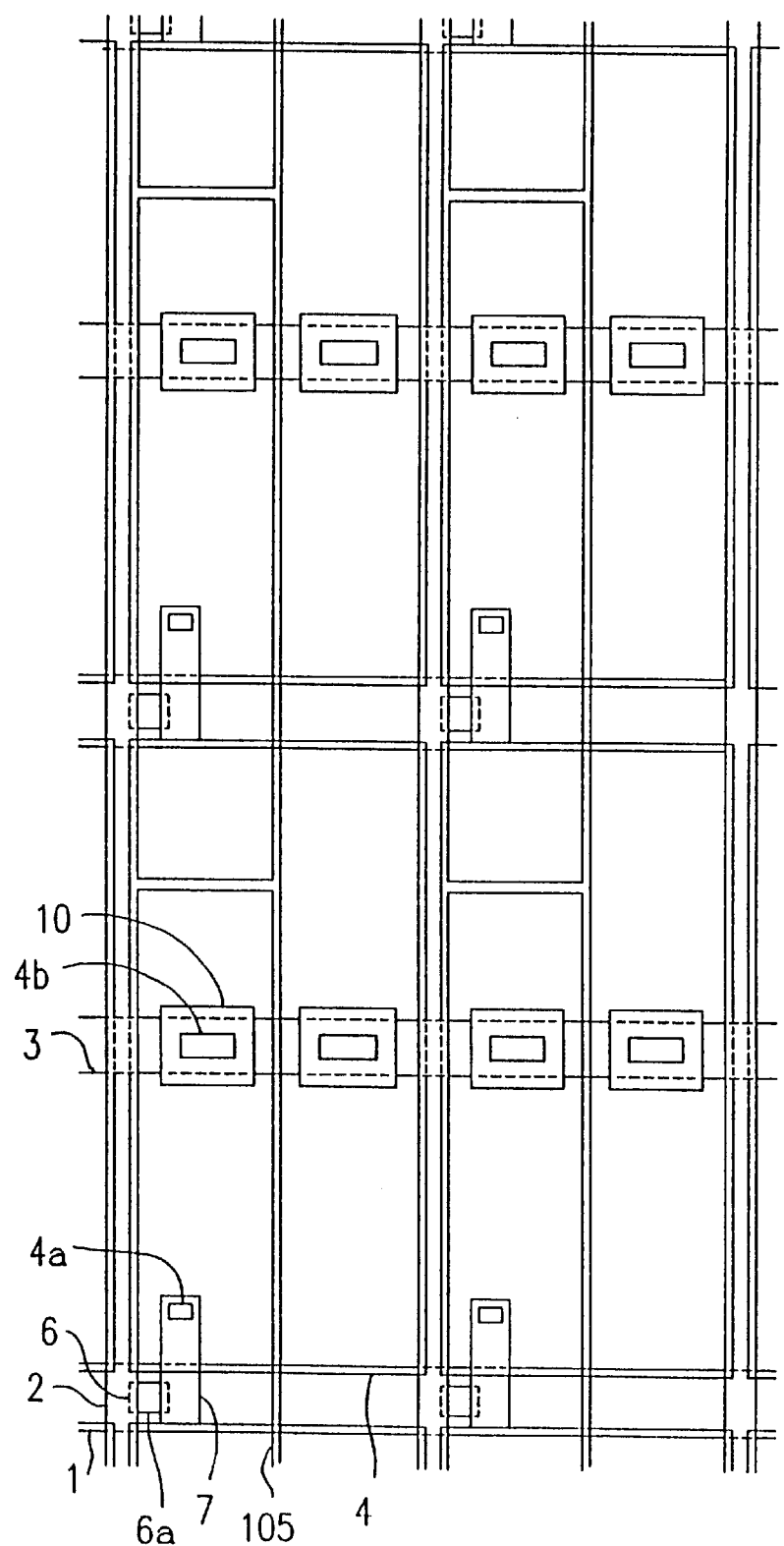
FIG. 17 is a plan view showing the configuration of the active matrix substrate in a conventional active matrix display device.
Figure 18:
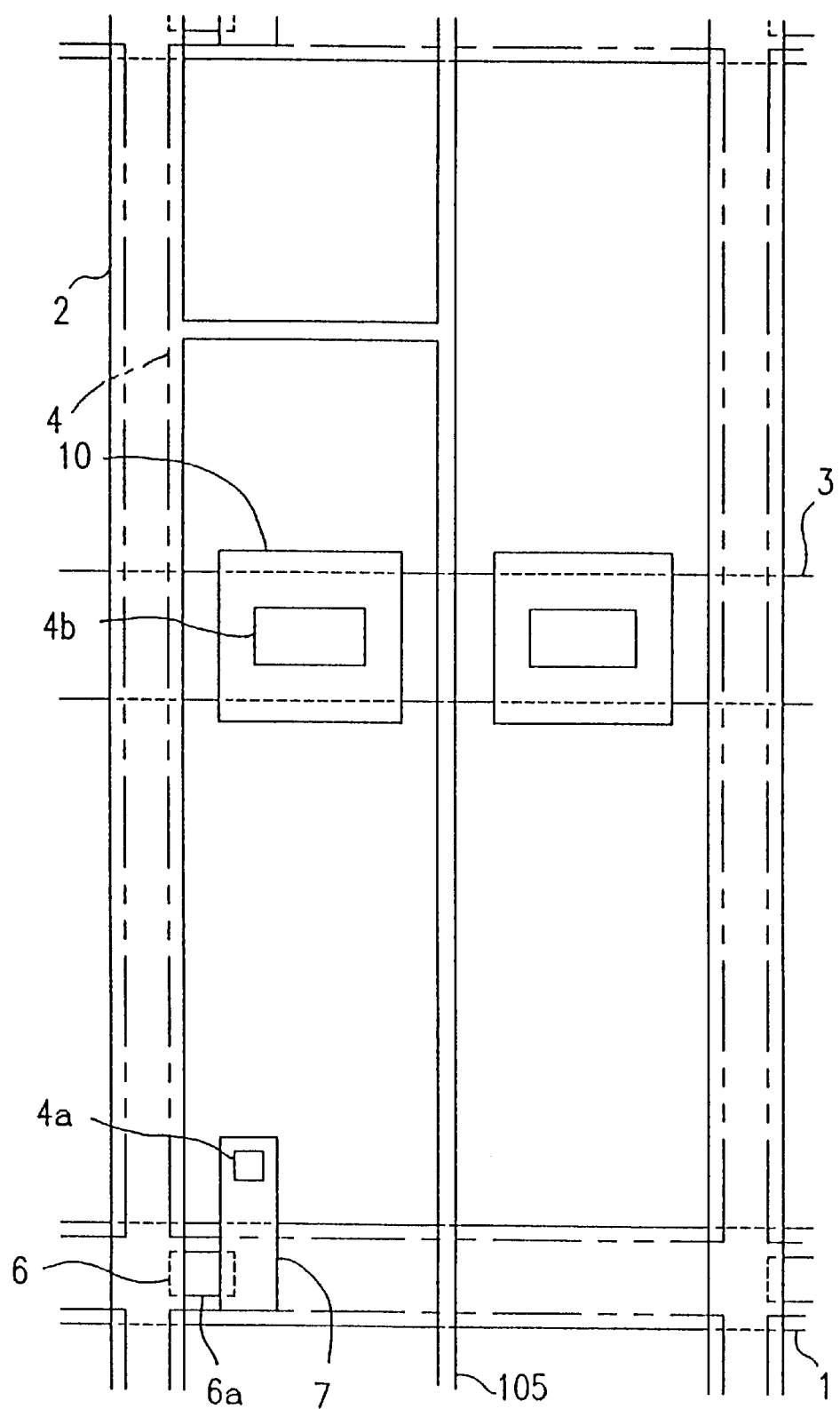
FIG. 18 is a plan view showing the configuration of one pixel of the active matrix substrate in a conventional active matrix display device.
Figure 19:
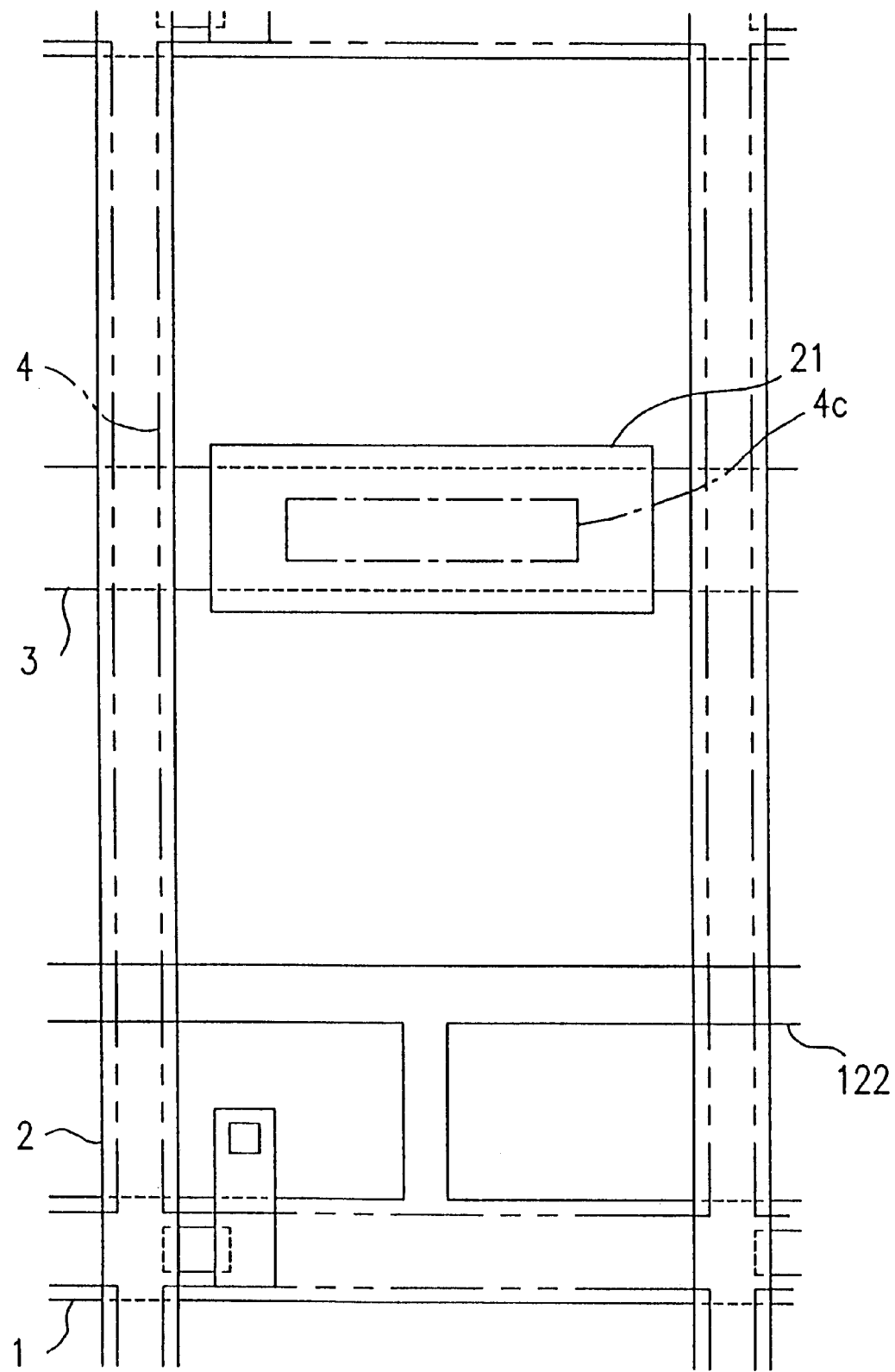
FIG. 19 is a plan view showing the configuration of one pixel of the active matrix substrate in a conventional active matrix display device.

The active matrix substrate shown in FIG. 12 to 14 has the same configuration as that of Example 1 except for the following points. The bypass spare line 5 is formed so as to overlap the data bus line 1 with the insulating film 12 interposed therebetween. The bypass spare line 5 is formed so as to avoid the intersections of the gate bus lines 1 and the data bus lines 2 and the intersections of the gate bus lines 1 and the Cs lines 3.

In the active matrix display device of Example 4, leaks are corrected as follows.

As shown in FIG. 13B, in the case where a leak between the gate bus line 1 and the data bus line 2 occurs in an intersection R of the gate bus line 1 and the data bus line 2, a laser beam is irradiated onto two points R1 and R2 with the intersection R therebetween so as to cut the data bus line 2. As a result, a voltage cannot be applied to the data bus line 2 at the intersection R, thereby correcting a leak between the gate bus line 1 and the data bus line 2. In this case, a leak can be corrected even after the formation of the bypass spare line 5. Therefore, even after attaching the active matrix substrate and a counter substrate to each other and then injecting a liquid crystal material into a gap therebetween, a defect can be corrected so as to improve the display device production yield.

As shown in FIG. 13C, in the case where a leak between the data bus line 2 and the Cs line 3 occurs at an intersection S between the data bus line 2 and the Cs line 3, the data bus line 2 can be cut by irradiating a light beam on the data bus line 2 at two points S1 and S2 with the intersection S therebetween. As a result, a voltage cannot be supplied to the data bus line 2 at the intersection S, thereby correcting a leak between the data bus line 2 and the Cs line 3.

Furthermore, as shown in FIG. 14, in the case where the disconnection occurs in a portion Q of the data bus line 2, a signal voltage is transmitted through the bypass spare line 5 so as to avoid the disconnected portion Q, and is applied to the part of the data bus line 2 positioned ahead of the disconnected portion Q. Thus, a signal voltage can be applied to the pixel electrode 4 positioned ahead of the disconnected portion Q.

In the case where the bypass spare line 5 is made of a transparent conductor, the bypass spare line 5 does not prevent light from transmitting through the pixel. As a result, an aperture ratio of the display device can be maintained. In the case where the bypass spare line 5 is formed of an opaque conductor, an aperture ratio of the display device can be also maintained because an area of the pixel shielded by the bypass spare line 5 is small.

Although the bypass spare line 5 is formed on the data bus line 2 with the insulating film 12 interposed therebetween in FIG. 12, it is also possible to provide the bypass spare line 22 on the gate bus line 1 with the insulating film 12 interposed therebetween. In such a case, the bypass spare line 22 is formed so as to avoid the intersections of the gate bus lines 1 and the data bus lines 2.

In Examples 1 to 4 described above, the bus line is out by irradiating a laser beam onto the bus line. In the case where a leak is found before attaching the active matrix substrate and the counter substrate to each other, the bus line may be also cut by physical means or chemical means. The same means is employed in the case where a leak is to be corrected during the fabrication of the active matrix substrate.

In Examples 1 to 3, the case where the data bus line 2 or the gate bus line 1 is disconnected has been described. In the case where a leak occurs at the intersection of the gate bus line 1 and the data bus line 2 or at the intersection of the data bus line 2 and the Cs line 3, the bus line 1 or 2 is cut at two points with the intersection where a leak occurs positioned therebetween as in Example 4. In this manner, a leak can be corrected. In the case where the bypass spare line does not avoid the intersection, the data bus line 2 or the gate bus line 1 should be cut at the two points with the intersection positioned therebetween before forming the bypass spare line 5 or 22.

Although a reverse stagger type TFT is employed as a switching element, a stagger type TFT may be used instead. Any material, structures and fabrication methods may be used as long as they can be used to form a TFT functioning as a switching element. For example, other switching elements such as an MIM element may be used. In the case where a stagger type TFT is used, the arrangement of gate bus lines and semiconductor layers differs from that of the case where a reverse stagger type TFT is used. In the case where the MIM element is used, the gate bus line 1 serving as a scanning line is not formed on the active matrix substrate. Instead, a scanning line having the same width as that of the pixel electrode is provided on a counter substrate (or a color filter substrate). Therefore, the present invention is applicable to the data bus line which is formed along with the MIM elements on the active matrix substrate. In such a case, however, the pixel electrodes and the data bus lines are respectively formed in different layers with and insulating film interposed therebetween.

In Examples 1 to 4, the bypass spare line is formed on the insulating film covering the signal line, and the pixel electrodes are formed on the second insulating film formed on the bypass spare line. However, the bypass spare lines and the pixel electrodes may be formed in the same layer on the same insulating film.

Although the bypass spare line is connected to each of the bus lines via a contact hole formed in the insulating film in Examples 1 to 4, the bypass spare line and each of the bus lines may be connected to each other at terminals of each of the bus lines.

Furthermore, although liquid crystal is employed as a display medium, other display mediums such as plasma may be used.

As is apparent from the above description, according to the active matrix display device of the present invention, in the case where a disconnection occurs in the scanning line or the signal line, a scan voltage or a signal voltage bypasses the disconnected portion and is transmitted through the bypass spare line so as to be applied to part of the scanning line or the signal line positioned ahead of the disconnected portion. Therefore, even where the scanning line or the signal line is disconnected, a scan voltage or a signal voltage can be applied to the pixel electrode positioned ahead of the disconnected portion. As a result, it is possible to prevent a line defect from occurring so as to remarkably improve the ratio of acceptable display devices. Thus, the fabrication cost can be lowered while improving a reliability of the display device. Moreover, since the bypass spare line overlaps the scanning line or the signal line, the bypass spare line does not shield light. Therefore, the aperture ratio of the display device is not lowered. Furthermore, the bypass spare line does not traverse the pixel electrode region. Even if so, a traversed area is remarkably small. Therefore, display characteristics can be prevented from being deteriorated due to a capacitance between the bypass spare line and the pixel electrode. As a result, the display quality can be enhanced.

According to a method for correcting a defect of an active matrix display device of the present invention, a bypass spare line is formed on the line where a disconnection occurs in an overlapped manner with an insulating film interposed therebetween. By electrically connecting the defective line and the bypass spare line to each other, a disconnection can be corrected. Alternatively, any one of the lines is cut at two points interposing the intersection where a leak occurs. Then, the bypass spare line is formed on the cut line in an overlapped manner with an insulating film interposed therebetween, so that the bypass spare line and the cut line electrically connected to each other. In this manner, leak can be corrected. As a result, a line defect can be prevented from occurring so as to remarkably improve the production ratio of acceptable display devices. Furthermore, since the insulating film and the bypass spare line can be formed only on the portion where defects such as a disconnection or a leak occur, the fabrication cost can be further reduced.

The bypass spare line may be formed so as to avoid the intersection of the scanning line and the signal line. In such a case, a leak at the intersection can be corrected by laser irradiation even after the completion of a display device by attaching the active matrix substrate and the counter substrate to each other and subsequently injecting a display medium therebetween. Therefore, the yield of the display devices can be further improved. The bypass spare line is provided so as to overlap the scanning line or the signal line with the insulating film interposed therebetween and to avoid the intersection, an area where light is prevented from being transmitted through the pixel by the bypass spare line is extremely small. Thus, the aperture ratio of the display devices is not lowered.

In the case where a contact hold for connecting the bypass spare line and the scanning line or the signal line to each other, which is formed through the insulating film, is provided on each of the terminals of the scanning line or the signal line, the number of contact holes can be minimized. Therefore, a large contact area can be formed in the region other than the display region. As a result, a yield of the contact holes can be remarkably improved so as to further reduce the fabrication cost. Furthermore, since the contact are is large, a connection resistance between the scanning line or the signal line and the bypass spare line is lowered to improve a reliability of the connection. Accordingly, a reliability of the display device can be further improved.

In the case where a contact hold for connecting the bypass spare line and the scanning line or the signal line is formed through the insulating film so as to be apart from each of the intersections of the signal lines and the scanning lines by a predetermined distance, the signal lines or the scanning lines corresponding to the respective pixel electrodes can be connected by the bypass spare line.

If the bypass spare line is formed by using a transparent conductor, the bypass spare line does not prevent light from being transmitted through the pixel even if the bypass spare line is provided so as to avoid the intersection of the bus lines and to traverse the pixel electrode region. Therefore, a leak occurring at the intersection can be corrected, and a high aperture ratio can be maintained even after a display medium such as liquid crystal is injected into the gap between the substrates. Furthermore, since the width of the bypass spare line can be determined so as to be larger than that of the scanning line or the signal line, the occurrence of the disconnection of the bypass spare line can be reduced to improve a yield.

If the bypass spare line is formed by using an opaque conductor, a resistance of the bypass spare line can be lowered. Therefore, even if a scan voltage or a signal voltage is transmitted through the bypass spare line to be applied to the pixel electrode, the display quality is further enhanced.

If the pixel electrode is formed on an organic insulating film covering the signal lines, the capacitance between the pixel electrode and the signal line is reduced. The capacitance between the scanning line and the pixel electrode formed below the signal line can be also reduced. Therefore, crosstalk due to the capacitance between the pixel electrode and the signal line is reduced as well as the lead-in of a pixel voltage due to the capacitance between the pixel electrode and the scanning line can be restrained. As a result, the effects due to these capacitances are restrained to further improve the display quality.

If the bypass spare line is formed on the organic insulating film covering the signal lines, a yield is improved because the disconnection of the bypass spare line hardly occurs. Moreover, if the pixel electrodes and the bypass spare lines are formed in the same layer, as is shown in FIG. 3C, the pixel electrodes and the bypass spare lines can be patterned at the time by using a single mask. As a result, the fabrication cost can be further reduced.

If the bypass spare lines are formed on the insulating film covering the signal lines, and the pixel electrodes are formed on the second insulating film covering the bypass spare lines, a leak between the pixel electrodes and the bypass spare lines hardly occurs because the pixel electrodes and the bypass spare lines are formed in different layers. Moreover, in the case where an organic insulating film is used as the insulating film covering the signal lines, such an insulating film is advantageous in that, even if the signal line is disconnected by steep unevenness due to peal-off or defects of the gate insulating films, such unevenness can be flattened by the insulating film. Therefore, the bypass spare line is seldom disconnected and the disconnection of the signal line is avoided through the bypass spare line, the ratio of acceptable products can be increased. Moreover, in the case where an organic insulating film is used as a second insulating film covering the bypass spare lines, the difference in level between the bus lines can be flattened by the organic insulating film. Therefore, the orientation of the liquid crystal materials or the like in the display medium is not disturbed. As a result, the display quality can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix display device comprising:
    a plurality of pixel electrodes arranged in a matrix;
    a plurality of switching elements connected to the respective pixel electrodes;
    a plurality of scanning lines for supplying a scan voltage to the switching elements;
    a plurality of signal lines for supplying a signal voltage to the switching elements, provided so as to cross the scanning lines;
    an insulating film between the matrix of pixel electrodes and the scanning lines and signal lines, and
    a bypass spare line for avoiding at least one of a disconnected portion and a leak portion, formed so as to overlap at least one of the scanning line and the signal line with the insulating film interposed between the bypass spare line and the at least one of the scanning line and the signal line, and the bypass spare line and pixel electrodes being on a same side of the insulating film;
    wherein the bypass spare line and at least one of the scanning line and the signal line are electrically connected to each other.

2. An active matrix display device according to claim 1, wherein the bypass spare line is formed so as to avoid an intersection of the scanning line and the signal line.

3. An active matrix display device according to claim 1, wherein the bypass spare line and at least one of the scanning line and the signal line are electrically connected to each other via a contact hole formed through the insulating film, and the contact hole is formed at a position which is apart from the intersection of the line overlapping the bypass spare line and a crossing line by a predetermined distance.

4. An active matrix display device according to claim 1, wherein the bypass spare line and at least one of the scanning line and the signal line are electrically connected to each other via a contact hole formed through the insulating film, and the contact hole is formed on each end of the line overlapping the bypass spare line.

5. An active matrix display device according to claim 1, wherein the bypass spare line is made of an opaque conductor.

6. An active matrix display device according to claim 1, wherein the insulating film covering the signal lines is made of an organic insulating film, and the pixel electrodes are provided on the insulating film.

7. An active matrix display device according to claim 1, wherein a second insulating film is provided so as to cover the bypass spare line, and the pixel electrodes are provided on the second insulating film.

8. An active matrix display device according to claim 7, wherein at least one of the insulating film and the second insulating film is an organic insulating film.

9. A method for correcting a defect of an active matrix display device comprising:
    a plurality of pixel electrodes arranged in a matrix;
    a plurality of switching elements connected to the respective pixel electrodes;
    a plurality of scanning lines for supplying a scan voltage to the switching elements;
    a plurality of signal lines for supplying a signal voltage to the switching elements, provided so as to cross the scanning lines;
    an insulating film between the matrix of pixel electrodes and the scanning lines and signal lines, and a bypass spare line for avoiding at least one of a disconnected portion and a leak portion, formed so as to overlap at least one of the scanning line and the signal line with the insulating film interposed between the bypass spare line and the at least one of the scanning line and the signal line, and the bypass spare line and the pixel electrodes being on a same side of the insulating film, and wherein the bypass spare line and at least one of the scanning line and the signal line are electrically connected to each other, and wherein the method comprising the steps of:
  determining the presence of a leak at the intersection of the scanning line end the signal line; and
  cutting one of the scanning line and the signal line with which the bypass spare line overlaps.

10. An active matrix display device comprising:

a plurality of pixel electrodes arranged in a matrix;

a plurality of switching elements connected to the respective pixel electrodes;

a plurality of scanning lines for supplying a scan voltage to the switching elements;

a plurality of signal lines for supplying a signal voltage to the switching elements, provided so as to cross the scanning lines;

an insulating film between the matrix of pixel electrodes and the scanning lines and signal lines;

a bypass spare line for avoiding at least one of a disconnected portion and a leak portion, formed so as to overlap at least one of the scanning line and the signal line with the insulating film interposed between the bypass spare line and the at least one of the scanning line and the signal line;

wherein the bypass spare line and at least one of the scanning line and the signal line are electrically connected to each other, and wherein the bypass spare line is made of a transparent conductor.

11. An active matrix display device comprising:

a plurality of pixel electrodes arranged in a matrix;

a plurality of switching elements connected to the respective pixel electrodes;

a plurality of scanning lines for supplying a scan voltage to the switching elements;

a plurality of signal lines for supplying a signal voltage to the switching elements, provided so as to cross the scanning lines;

an organic insulating film between the matrix of pixel electrodes and the scanning lines and signal lines;

a bypass spare line for avoiding at least one of a disconnected portion and a leak portion, formed so as to overlap at least one of the scanning line and the signal line with the insulating film interposed between the bypass spare line and the at least one of the scanning line and the signal line;

wherein the bypass spare line and at least one of the scanning line and the signal line are electrically connected to each other, and wherein the bypass spare line is provided on the organic insulating film, and is simultaneously patterned along with the pixel electrodes using an identical material.

12. A method for correcting a defect of an active matrix display device comprising:

a plurality of pixel electrodes arranged in a matrix;

a plurality of switching elements connected to the respective pixel electrodes;

a plurality of scanning lines for supplying a scan voltage to the switching elements;

a plurality of signal lines for supplying a signal voltage to the switching elements, provided so as to cross the scanning lines; and an insulating film between the pixel electrodes on a first side of the film, and the scanning lines and signal lines on a second side of the film;

the method comprising the steps of:
  determining the presence of a disconnection in the scanning lines and the signal lines; and
  forming a bypass spare line on the line including the disconnection in an overlapped manner with the spare line on the first side of the insulating film, and electrically connecting the bypass spare line and at least one of the scanning line and the signal line to each other.

13. A method for correcting a leak of an active matrix display device comprising:

a plurality of pixel electrodes arranged in a matrix;

a plurality of switching elements connected to the respective pixel electrodes;

a plurality of scanning lines for supplying a scan voltage to the switching elements;

a plurality of signal lines for supplying a signal voltage to the switching elements, provided so as to cross the scanning lines, and an insulating film between the pixel electrodes on a first side of the film, and the scanning lines and signal lines on a second side of the film;

the method comprising the steps of:
  determining the presence of a leak in the scanning lines and the signal lines; and
  cutting at least one of the scanning line and the signal line including an intersection where the leak occurs, at two points with the intersection positioned therebetween;
  forming a bypass spare line on the line including the intersection where the leak occurs in an overlapped manner with the spare line on the first side of the insulating film, and electrically connecting the bypass spare line and at least one of the scanning line and the signal line to each other.

14. An active matrix display device comprising:

a plurality of pixel electrodes arranged in a matrix;

a plurality of switching elements connected to the respective pixel electrodes;

a plurality of scanning lines for supplying a scan voltage to the switching elements;

a plurality of signal lines for supplying a signal voltage to the switching elements, provided so as to cross the scanning lines, and an insulating film between the pixel electrodes on a first side of the film, and the scanning lines and signal lines on a second side of the film;

wherein a bypass spare line overlaps at least one of the scanning line and the signal line where a disconnection occurs with the spare line on the first side of the insulating film, and the bypass spare line and at least one of the scanning line and the signal line are electrically connected to each other.

15. An active matrix display device according to claim 14, wherein the bypass spare line and at least one of the scanning line and the signal line are electrically connected to each other via a contact hole formed through the insulating film, and the contact hole is formed at a position which is apart from the intersection of the line overlapping the bypass spare line and a crossing line by a predetermined distance.

16. An active matrix display device according to claim 14, wherein the bypass spare line and at least one of the scanning line and the signal line are electrically connected to each other via a contact hole formed through the insulating film, and the contact hole is formed on each end of the line overlapping the bypass spare line.

17. An active matrix display device according to claim 14, wherein the bypass spare line is made of a transparent conductor.

18. An active matrix display device according to claim 14, wherein the bypass spare line is made of an opaque conductor.

19. An active matrix display device according to claim 14, wherein the insulating film covering the signal lines is made of an organic insulating film, and the pixel electrodes are provided on the insulating film.

20. An active matrix display device according to claim 19, wherein the bypass spare line is provided on the organic insulating film, and is simultaneously patterned along with the pixel electrodes using an identical material.

21. An active matrix display device according to claim 14, wherein a second insulating film is provided so as to cover the bypass spare line, and the pixel electrodes are provided on the second insulating film.

22. An active matrix display device according to claim 21, wherein as least one of the insulating film and the second insulating film is an organic insulating film.

23. An active matrix display device comprising:
   a plurality of pixel electrodes arranged in a matrix;
   a plurality of switching elements connected to the respective pixel electrodes;
   a plurality scanning lines for supplying a scan voltage to the switching elements; and
   a plurality of signal lines for supplying a signal voltage to the switching elements, provided so as to cross the scanning lines, and
   an insulating film between the pixel electrodes on a first side of the film, and the scanning lines and signal lines on a second side of the film;
   wherein an intersection between at least one of the scanning lines and the signal lines is bracketed by cuts through the at least one of the scanning lines at two points with the intersection positioned therebetween, a bypass spare line overlaps the cut at least one of the scanning lines with the spare line on the first side of the insulating film, and
   the bypass spare line and the cut at least one of the scanning line and the signal line are electrically connected to each other.

24. An active matrix display device according to claim 23, wherein the bypass spare line is formed so as to avoid an intersection of the scanning line and the signal line.

25. A method for correcting a defect of an active matrix display device according to claim 24, the method comprising the steps of:
   determining the presence of a leak at the intersection of the scanning line and the signal line; and
   cutting one of the scanning line and the signal line with which the bypass spare line overlaps.

26. An active matrix display device according to claim 23, wherein the bypass spare line and at least one of the scanning line and the signal line are electrically connected to each other via a contact hole formed through the insulating film, and the contact hole is formed at a position which is apart from the intersection of the line overlapping the bypass spare line and a crossing line by a predetermined distance.

27. An active matrix display device according to claim 23, wherein the bypass spare line and at least one of the scanning line and the signal line are electrically connected to each other via a contact hole formed through the insulating film, and the contact hole is formed on each end of the line overlapping the bypass spare line.

28. An active matrix display device according to claim 23, wherein the bypass spare line is made of a transparent conductor.

29. An active matrix display device according to claim 23, wherein the bypass spare line is made of an opaque conductor.

30. An active matrix display device according to claim 23, wherein the insulating film covering the signal lines is made of an organic insulating film, and the pixel electrodes are provided on the insulating film.

31. An active matrix display device according to claim 30, wherein the bypass spare line is provided on the organic insulating film, and is simultaneously patterned along with the pixel electrodes using an identical material.

32. An active matrix display device according to claim 23, wherein a second insulating film is provided so as to cover the bypass spare line, and the pixel electrodes are provided on the second insulating film.

33. An active matrix display device according to claim 32, wherein at least one of the insulating film and the second insulating film is an organic insulating film.

* * * * *